(12) United States Patent
Jones et al.

(10) Patent No.: US 9,829,164 B2
(45) Date of Patent: Nov. 28, 2017

(54) MIRROR FOR SOLAR-SKYPIPE COLLECTOR

(71) Applicant: Fraen Corporation, Reading, MA (US)

(72) Inventors: Carlton S. Jones, Boxford, MA (US); Renald Dore, Malden, MA (US)

(73) Assignee: Fraen Corporation, Reading, MA (US)

( * ) Notice: Subject to any disclaimer, the term of this patent is extended or adjusted under 35 U.S.C. 154(b) by 0 days.

(21) Appl. No.: 14/965,380

(22) Filed: Dec. 10, 2015

(65) Prior Publication Data

US 2016/0169465 A1 Jun. 16, 2016

Related U.S. Application Data

(60) Provisional application No. 62/090,215, filed on Dec. 10, 2014.

(51) Int. Cl.
| | |
|---|---|
| *F21S 11/00* | (2006.01) |
| *F24J 2/06* | (2006.01) |
| *F24J 2/10* | (2006.01) |
| *F21V 8/00* | (2006.01) |
| *F21V 7/00* | (2006.01) |
| *F21V 7/04* | (2006.01) |

(52) U.S. Cl.
CPC ........... *F21S 11/002* (2013.01); *F21S 11/007* (2013.01); *F21V 7/0025* (2013.01); *F21V 7/04* (2013.01); *F24J 2/067* (2013.01); *F24J 2/10* (2013.01); *G02B 6/0008* (2013.01); *G02B 6/0018* (2013.01); *Y02E 10/40* (2013.01)

(58) Field of Classification Search
CPC .............................. F21S 11/002; F21S 11/007

USPC .................................................. 359/592-593
See application file for complete search history.

(56) References Cited

U.S. PATENT DOCUMENTS

| | | | | |
|---|---|---|---|---|
| 5,285,315 | A * | 2/1994 | Stiles | ........................ E06B 9/24 |
| | | | | 359/592 |
| 6,128,135 | A | 10/2000 | Stiles et al. | |
| 8,184,372 | B1 | 5/2012 | Gu | |
| 2007/0035841 | A1* | 2/2007 | Kinney | .................... F21S 11/00 |
| | | | | 359/592 |
| 2011/0000515 | A1 | 1/2011 | Patwardhan et al. | |
| | | | (Continued) | |

FOREIGN PATENT DOCUMENTS

| | | | | |
|---|---|---|---|---|
| CA | WO 2014172779 A1 * | 10/2014 | ............ F21V 7/0033 |
| EP | 2258907 A1 | 12/2010 | |
| | (Continued) | | |

OTHER PUBLICATIONS

International Search Report and Written Opinion for PCT/US2015/065012, dated May 10, 2016; 14 pages.

*Primary Examiner* — Christopher Mahoney
(74) *Attorney, Agent, or Firm* — Reza Mollaaghababa; Thomas Engellenner; Pepper Hamilton LLP

(57) ABSTRACT

A solar collector is disclosed in which a light pipe having an optical axis and extending from a proximal end configured to receive sunlight to a distal end, and a plurality of reflective elements optically coupled to the light pipe. Each of the reflective elements is configured to direct at least a portion of sunlight incident thereon into the light pipe via the proximal end substantially parallel to the optical axis for a plurality of positions of the sun in the sky. Baffles coupled to the reflective elements further enhance the collectors ability to increase the light collected.

30 Claims, 30 Drawing Sheets

(56) References Cited

U.S. PATENT DOCUMENTS

| | | | | |
|---|---|---|---|---|
| 2013/0135744 A1* | 5/2013 | Jaster | ............... | G02B 17/00 |
| | | | | 359/597 |
| 2014/0126063 A1* | 5/2014 | Whang | ............. | G02B 19/0028 |
| | | | | 359/592 |
| 2015/0070769 A1* | 3/2015 | Maxey | ............... | F21S 11/002 |
| | | | | 359/597 |

FOREIGN PATENT DOCUMENTS

| | | |
|---|---|---|
| WO | 2014/074842 A1 | 5/2014 |
| WO | 2014/165987 A1 | 10/2014 |

\* cited by examiner

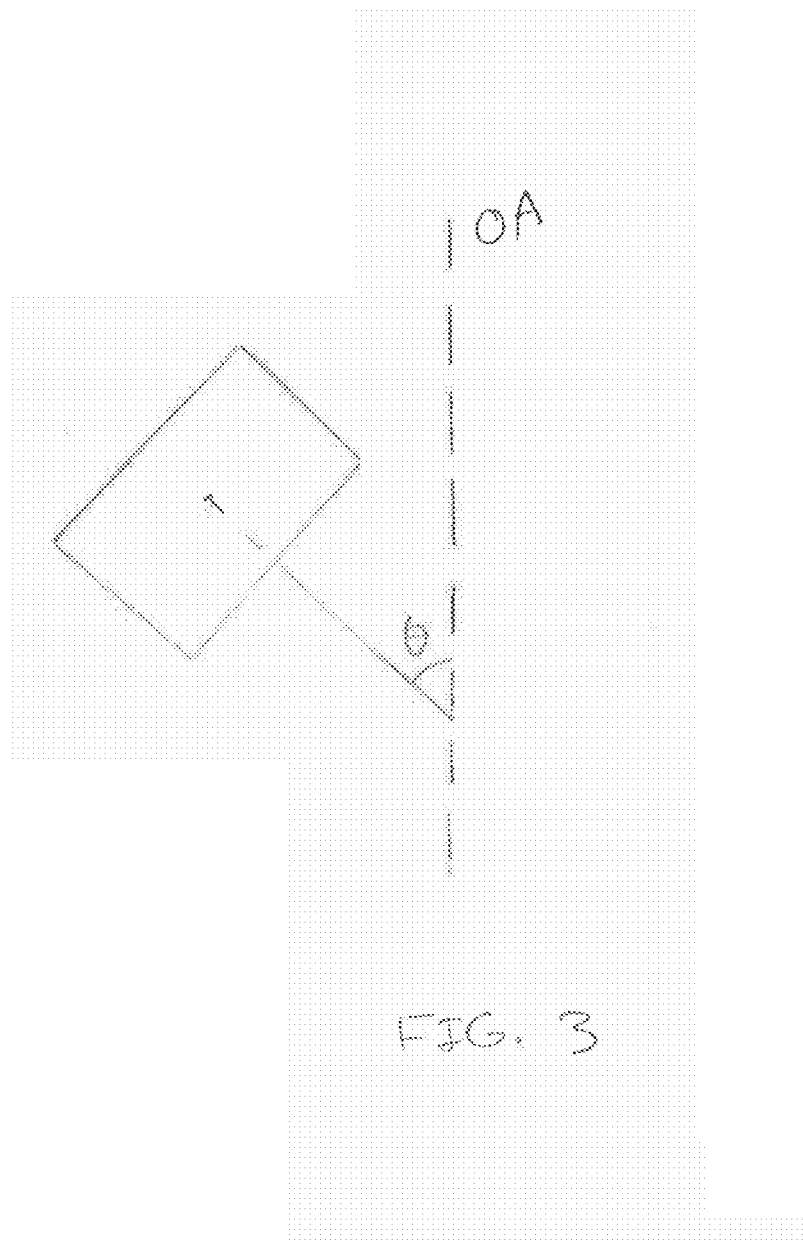

MIRROR FOR SOLAR-SKYPIPE COLLECTOR

CROSS-REFERENCE TO RELATED APPLICATIONS

The present application claims priority to U.S. Provisional Application No. 62/090,215, filed Dec. 10, 2014, which is herein incorporated by reference in its entirety.

BACKGROUND

The present invention relates generally to solar collectors, and more particularly to solar collectors that include one or more passive reflective surfaces for efficiently directing incident sunlight into a light pipe.

Conventional skylight systems direct sunlight collected via a structure typically positioned on the roof of a building into the interior of the building, e.g., via a window. Some skylight systems include a light pipe that directs the sunlight collected via its proximal end to a diffuser optically coupled to its distal end. The diffuser can control/shape the pattern of illumination delivered to the interior of the building. Some typical performance metrics of such systems include total lumens delivered by the system (for a given roof-hole diameter), evenness of the daylighting curve, the percentage of the collected light reaching a target surface (known as fitted target efficacy), and the uniformity of target illumination. Some conventional systems employ a tall collector dome with prismatic or Fresnel geometry to re-direct the low-angle sunlight (e.g., early morning or late afternoon) into the light pipe to improve the performance metrics of the system.

There is still, however, a need for improved solar collectors, which can efficiently harness sunlight for lighting applications.

SUMMARY

In one aspect, a solar collector is disclosed, which comprises a light pipe having an optical axis and extending from a proximal end configured to receive sunlight to a distal end, and a plurality of reflective elements optically coupled to the light pipe, wherein each of the reflective elements is configured to direct at least a portion of sunlight incident thereon into the light pipe via the proximal end substantially parallel to the optical axis for a plurality of positions of the sun in the sky.

The light pipe comprises an internal reflective surface. In some embodiments, the light pipe's internal surface is rotationally symmetric about the optical axis of the light pipe. In some embodiments, a diffuser is optically coupled to the distal end of the light pipe.

In some embodiments, each of the reflective elements is configured to direct at least about 80 percent, or at least about 90 percent, and preferably 100 percent, of the incident sunlight energy into the light pipe substantially parallel to the optical axis for the plurality of positions of the sun in the sky.

The reflective elements are fixedly disposed relative to one another and relative to the light pipe. Each of the reflective elements comprises a front reflective surface for specularly reflecting incident sunlight and a back reflective surface for diffusely reflecting incident sunlight. In some embodiments, the front reflective surface is flat while in some other embodiments the front reflective surface exhibits a slight convex curvature, e.g., a radius of curvature in a range of about 3 inches to about 10 inches in one embodiment.

Each of the reflective elements can be formed of a variety of different materials, such as metal and/or plastic. By way of example, in some embodiments the front surface is a reflective aluminum surface. In some other embodiments, one or more of the reflectors can be formed of plastic, e.g., via molding, and the front reflective surface of the reflector can be generated by vacuum metallization of a surface of the plastic reflector.

Each position of the sun in the sky can be characterized by an altitude and an azimuth angle. Each of the reflective elements can be positioned around the optical axis so as to receive sunlight corresponding to a plurality of altitude angles and can be tilted relative to the optical axis so as to direct at least a portion of the received sunlight, e.g., at least about 80 percent, or at least about 90 percent, and preferably 100 percent of the incident sunlight energy, into the light pipe substantially parallel to the optical axis for a plurality of respective altitude angles. By way of example, in some embodiments, the reflective elements are positioned relative to the optical axis at tilt angles in a range of about 25 degrees about 50 degrees.

In some embodiments, the reflective elements are configured such that the irradiance of light exiting the distal end of the light pipe is characterized by a substantially flat lumens curve for at least one time interval, e.g., at least about 8 hours, within at least one day of the year.

In some embodiments, the reflectors are configured such that the back surfaces thereof block entry of at least 20 percent of sunlight energy into the light pipe for an altitude angle of the sun greater than about 30 degrees. By way of example, the back surface of the reflectors can diffusely reflect the incident light away from the light pipe.

In some embodiments, the reflective elements comprise at least a first reflector array configured for directing incident sunlight into the light pipe substantially parallel to the optical axis during a first time interval in spring or fall at a reference location and a second reflector array configured for directing incident sunlight into the light pipe substantially parallel to the optical axis during a second time interval in winter at the reference location. In some implementations, the first time interval is a time interval at winter solstice and the second time interval is a time interval at spring or fall equinox. In some implementations, the surface area of the front reflective surface of at least one reflector in the second array is less than a respective surface area of at least one reflector in the first array.

In a related aspect, a solar collector is disclosed, which comprises a light pipe extending from a proximal end to a distal end, and a plurality of passive reflective elements optically coupled to the proximal end so as to direct incident sunlight into the light pipe. The reflective elements are sized and configured such that the sunlight exiting the distal end of the light pipe exhibits a substantially flat lumens curve for at least one interval, e.g., at least about 8 hours, in at least one day of the year.

In some embodiments of the above solar collector, the sunlight exiting the distal end of the light pipe exhibits a substantially flat lumens curve for a plurality of time intervals in a plurality of days. In some embodiments of the above solar collector, the sunlight exiting the distal end of the light pipe exhibits a substantially flat lumens curve for a plurality of time intervals in a plurality of days in different seasons.

In a related aspect, a solar collector is disclosed, which comprises a light pipe disposed about an optical axis and extending from a proximal end to a distal end, and at least one specularly reflective curved surface optically coupled to the proximal end. The reflective surface is configured to direct at least a portion of sunlight incident thereon into the light pipe via the proximal end substantially parallel to the optical axis for a plurality of positions of the sun in the sky.

In yet another embodiment a solar collector includes a light pipe having an optical axis and extending from a proximal end configured to receive sunlight to a distal end, a plurality of reflective elements configured to direct at least a portion of sunlight incident thereon into the light pipe via the proximal end substantially parallel to the optical axis for a plurality of positions of the sun in the sky; and a plurality of baffles configured to modulate the sunlight received by the light pipe. The disclosed solar collector may also include a rear support element such that the plurality of reflective elements are coupled to the light pipe by the rear support element. Additionally, the solar collector's rear support element may be optically coupled to the light pipe around a portion of a circumference of the light pipe and have an interior surface that is specularly reflective.

A further feature of the solar collector includes an interior surface of the light pipe that is specularly reflective. The solar collector's baffles may also be affixed to the rear support element above the proximal end of the light pipe and also be substantially parallel to the optical axis of the light pipe. Additionally, the solar collector may include a window disposed about the circumference of the light pipe and extending above the proximal end of the light pipe. The window may also include a louver disposed on an inside surface of the window.

In another embodiment of the solar collector the plurality of reflective elements include a first second and third reflector arrays. The first and second reflector arrays are affixed to the light pipe by a plurality of baffles substantially parallel to the optical axis of the light pipe. The plurality of baffles may be non-specularly reflective and may have a matte-finished aluminum surface.

Further, the solar collector may include a lens optically coupled to the proximal end of the light pipe for focusing at least a portion of the sunlight incident thereon into the light pipe. The lens may a Fresnel lens and may have a curved surface.

BRIEF DESCRIPTION OF THE DRAWINGS

The above and other embodiments of the present invention will become more readily apparent from the following detailed description taken in connection with the accompanying drawings, in which

FIG. 3 depicts a tilt angle relative to an optical axis in accordance with an embodiment of the invention;

DETAILED DESCRIPTION

Figure 1A:
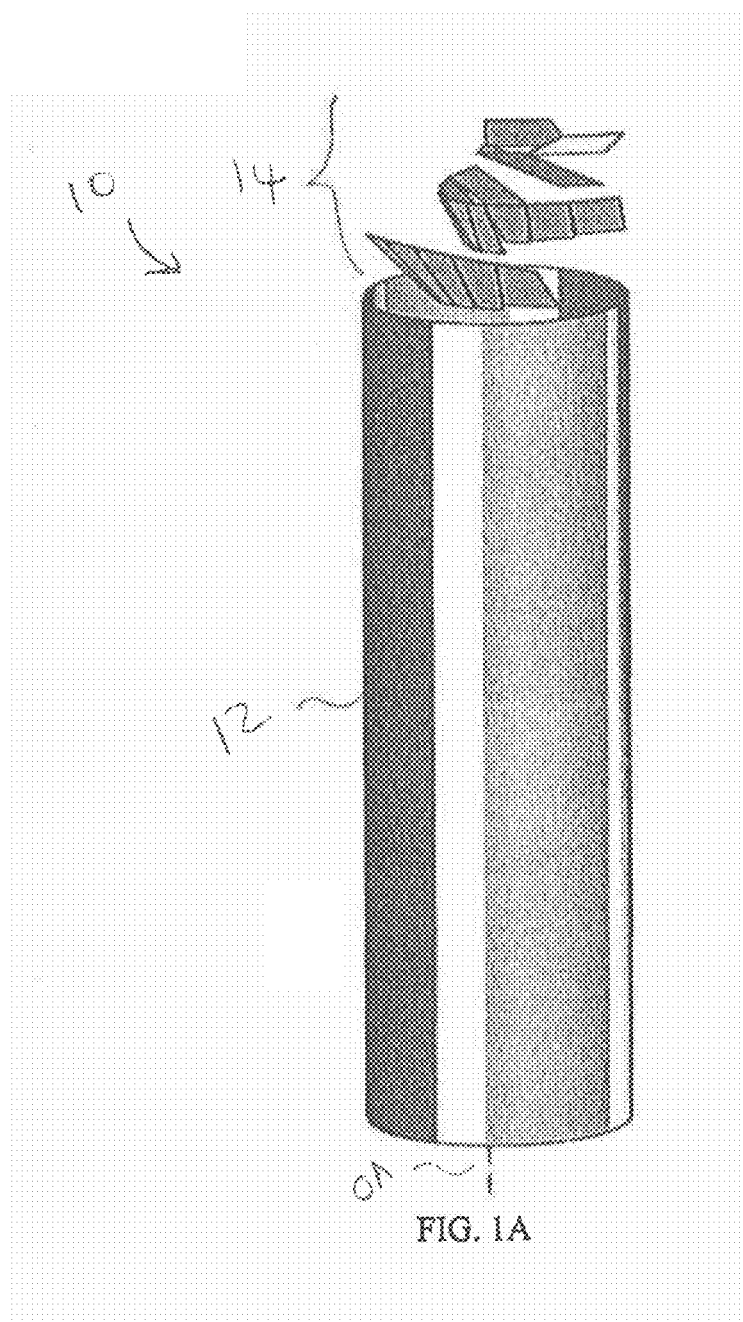
FIGS. 1A-1D depict a solar collector assembly in accordance with an embodiment of the invention.
Figure 1B:
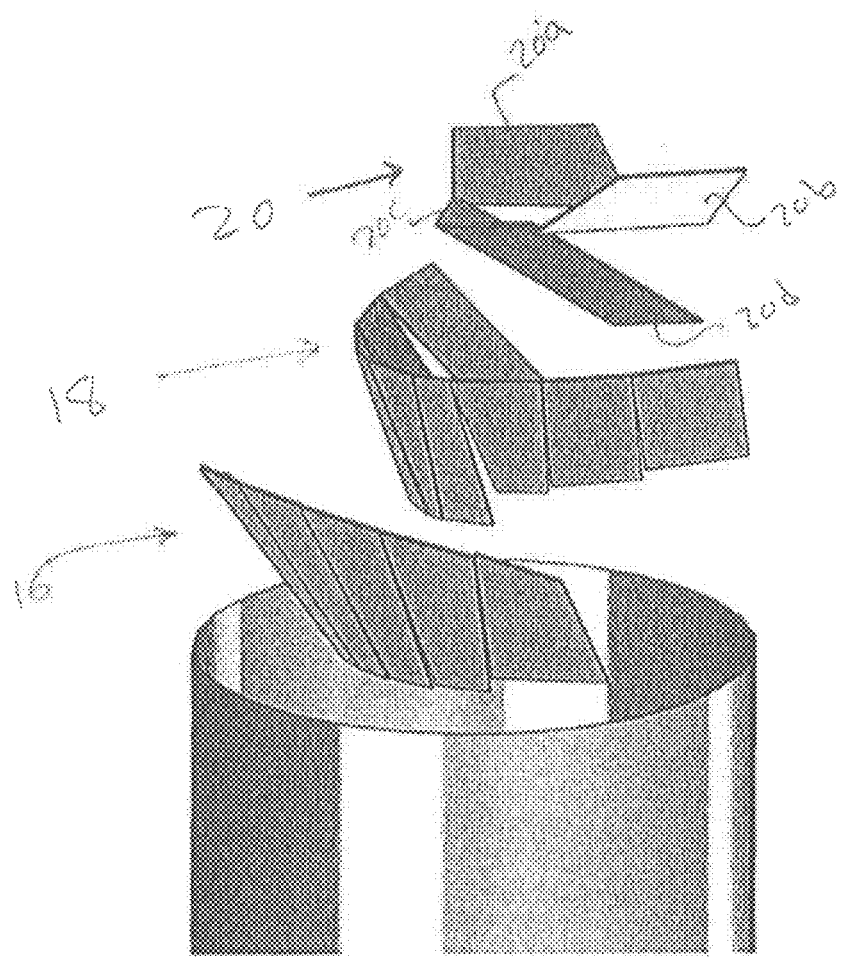

With reference to FIGS. 1A, 1B, 1C, 1D, 2A and 2B, a solar collector assembly 10 in accordance with an embodiment of the present teachings includes a light pipe 12 that is disposed about an optical axis (OA) and extends from a proximal end (PE) to distal end (DE). In this embodiment, the light pipe is rotationally symmetric about the optical axis. The solar collector assembly 10 further includes a passive reflector assembly 14 for coupling sunlight into the light pipe 12, as discussed in more detail below. The light pipe includes an inner reflective surface 12a for reflecting the light rays incident thereon toward the distal end of the light pipe. A light diffuser 15 is optionally disposed at or proximate to the distal end of the light pipe for receiving the light exiting the light pipe and diffusing the light. The diffuser can allow controlling and shaping the light to illuminate a target area in a desired pattern.

In this embodiment, the reflector assembly 14 includes twenty reflectors, which are segregated into three arrays (groups) of reflectors 16, 18 and 20. In this embodiment, the reflector arrays 16, 18, and 20 are disposed external to the light pipe and proximate to the proximal end of the light pipe. In another embodiment, one or more of the reflectors may be partially, or completely, enclosed by the light pipe 12. The reflector arrays 16, 18, and 20 can be fixedly coupled to the light pipe, e.g., via brackets or other fastening elements known in the art. For example, the reflectors can be held in place using a stamped aluminum fixture. As discussed below, each reflector array includes a plurality of passive reflectors that are fixedly positioned relative to one another and configured to efficiently direct incident light into the light pipe for a plurality of positions of the sun characterized by a plurality of azimuth and altitude angles.

In this embodiment, each of the reflectors of the reflector assembly 16 is in the form of a flat mirror having a front surface configured for specular reflection of incident sunlight and a back surface configured to diffusely reflect the incident light. In other embodiments, one or more of the reflectors include a slightly convex specularly reflective surface. By way of example, the radius of curvature of such a slightly convex reflective surface can be in a range of about 3 inches to about 10 inches. The reflectors can be formed of a variety of different materials, e.g., metal or a combination of plastic and metal, using manufacturing techniques known in the art. By way of example, in some embodiments, the reflectors can be formed of aluminum with the specularly reflective surfaces having a suitable coating, such as a coating providing at least 97 reflectivity. Alternatively, the reflectors can be formed of plastic, e.g., via molding, with the specularly reflective surface being formed by vacuum metallization of the underlying plastic surface.

In this embodiment, the bottom reflector array 16 is configured to direct the incident sunlight into the light pipe substantially parallel to the light pipe's optical axis in spring and fall during a selected time interval (e.g., between 7 am and 5 μm) at a reference location. More specifically, each of the reflectors of array 16 is configured to specularly reflect the incident sunlight, e.g., at least about 80 percent, or at least about 90 percent, and preferably 100 percent of the incident light energy, into the light pipe substantially parallel to the optical axis (OA) during a different portion of the time interval. For example, each reflector of the array 16 can be configured to reflect the incident sunlight into the light pipe along a direction substantially parallel to the optical axis (OA) during a different hour. In other words, each reflector of the array 16 can be dedicated to a different hour of the day for efficiently directing the incident sunlight into the light pipe. In this exemplary embodiment, the reference location is selected to be Denver, Colo., U.S.A. Other reference locations can also be chosen for designing a solar collector according to the present teachings.

The term "substantially parallel to the optical axis (OA)" as used herein is intended to mean that the light rays form an angle of less than 10 degrees, and in some cases an angle less than 5 degrees, relative to the optical axis. The modifier "about" as used herein indicates a variation of at most 5 percent.

In this embodiment, the middle array 18 is configured to direct the incident sunlight into the light pipe substantially parallel to the light pipe's optical axis in winter during a selected time interval (e.g., between 8 am and 4 pm) at the reference location. More specifically, each of the reflectors of array 18 is configured to specularly reflect the incident sunlight, e.g., at least about 80 percent, or at least about 90 percent, and preferably 100 percent of the incident light energy, into the light pipe substantially along the optical axis (OA) during a different portion of the time interval. For example, each reflector of the array 18 can be configured to reflect the incident sunlight into the light pipe along a direction substantially parallel to the optical axis (OA) during a different hour. In other words, each reflector of the array 18 can be dedicated to a different hour of the day for efficiently directing the incident sunlight into the light pipe.

Similar to the reflector array 16, the reflectors of the array 18 can be in the form of flat mirrors. Alternatively, the specularly reflective surfaces of one of more of the reflectors of the array 18 can exhibit a slightly convex curvature.

The top reflector array 20 includes 4 reflectors, two of which are configured for efficiently directing incident sunlight into the light pipe in the winter and the other two are configured for efficiently directing incident sunlight into the light pipe at the fall or spring equinox. More specifically, reflectors 20a and 20b are configured to reflect incident winter sunlight, e.g., at least about 80 percent, or at least about 90 percent, and preferably 100 percent of the incident light energy, into the light pipe 12 in a direction substantially parallel to the optical axis (OA) during sunrise to 7:30 am and 4:30 pm to sunset, respectively. Reflectors 20c and 20d are in turn configured to reflect incident fall sunlight, e.g., at least about 80 percent, or at least about 90 percent, and preferably 100 percent of the incident light energy, into the light pipe 12 in a direction substantially parallel to the optical axis (OA) during sunrise to 8:30 am and 3:30 pm to sunset, respectively.

More specifically, the bottom reflector array 16 includes reflectors 16a, 16b, 16c, 16d, 16e, 16f, and 16g, (herein collectively referred to as reflectors 16) that are in the form of flat mirrors and are configured for efficiently directing incident sunlight in spring and fall into the light pipe 12. In this embodiment, each of the reflectors 16 is configured to reflect the incident sunlight such that the reflected light rays enter into the light pipe substantially parallel to the optical axis (OA) for at least one time interval during the day (i.e., for a plurality of positions of the sun in the sky). In other words, each of the reflectors is configured to direct the light incident thereon into the light pipe along a direction substantially parallel to the optical axis (OA) for a different time interval of the day.

The tilt angle of each of the reflectors 16 relative to the optical axis (OA) is defined as the acute angle generated by the intersection of a putative normal vector to the reflector surface and the optical axis (OA) of the light pipe as shown schematically in FIG. 3. By way of example, the tilt angle of each reflector can be selected based on the altitude angle of the sun at a selected time during the time interval (e.g., the middle of the time interval) in which the reflector is slated to direct the incident sunlight into the light pipe in a direction substantially parallel to the optical axis (OA). For example, the tilt angle (0) can be selected such that the reflector would specularly reflect the incident sunlight substantially parallel to the optical axis (OA). In this embodiment, the tilt of the reflectors is selected based on the choice of Denver, Colo. as the reference location.

Figure 4:
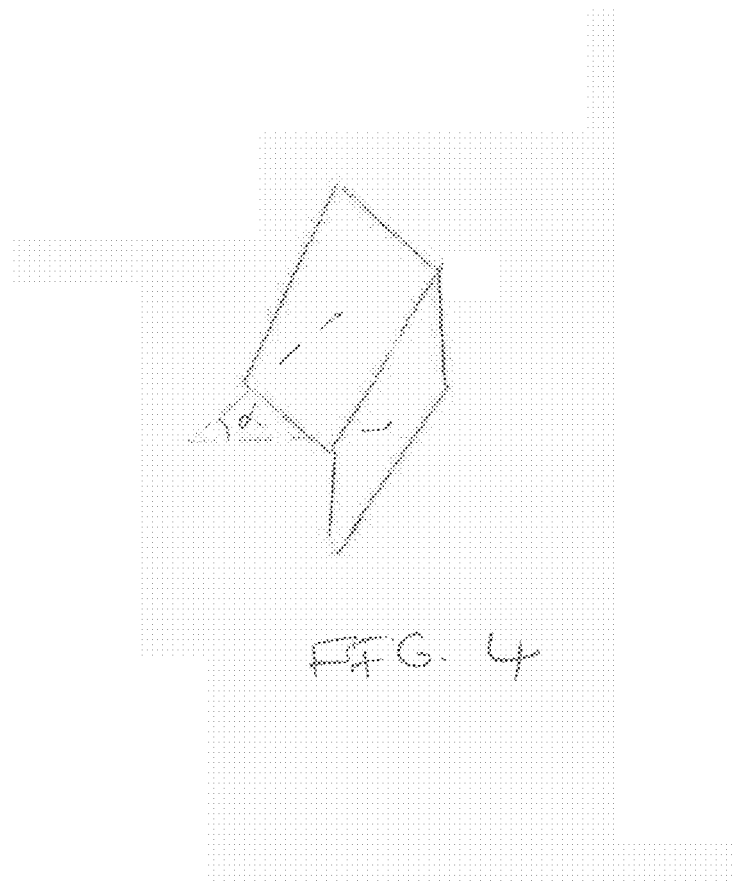
FIG. 4 depicts an angle formed at the intersection of putative normal vectors on the surfaces of reflectors in accordance with an embodiment of the invention.

Further, each reflector 16 is positioned about the optical axis (OA) based on the azimuth angle of the sun during the time interval in which the reflector directs the sunlight into the light pipe in a direction substantially parallel to the light pipe's optical axis (OA). In other words, the reflectors 16 are positioned relative to one another such that an angle between any two adjacent reflectors, which can be characterized by an angle formed at the intersection of putative normal vectors on the surfaces of those reflectors (e.g., angle α shown in FIG. 4), is indicative of the change in the azimuth angle of the sun between two times in the respective time intervals during which those two reflectors direct the incident sunlight into the light pipe substantially parallel to the optical axis.

Figure 2A:
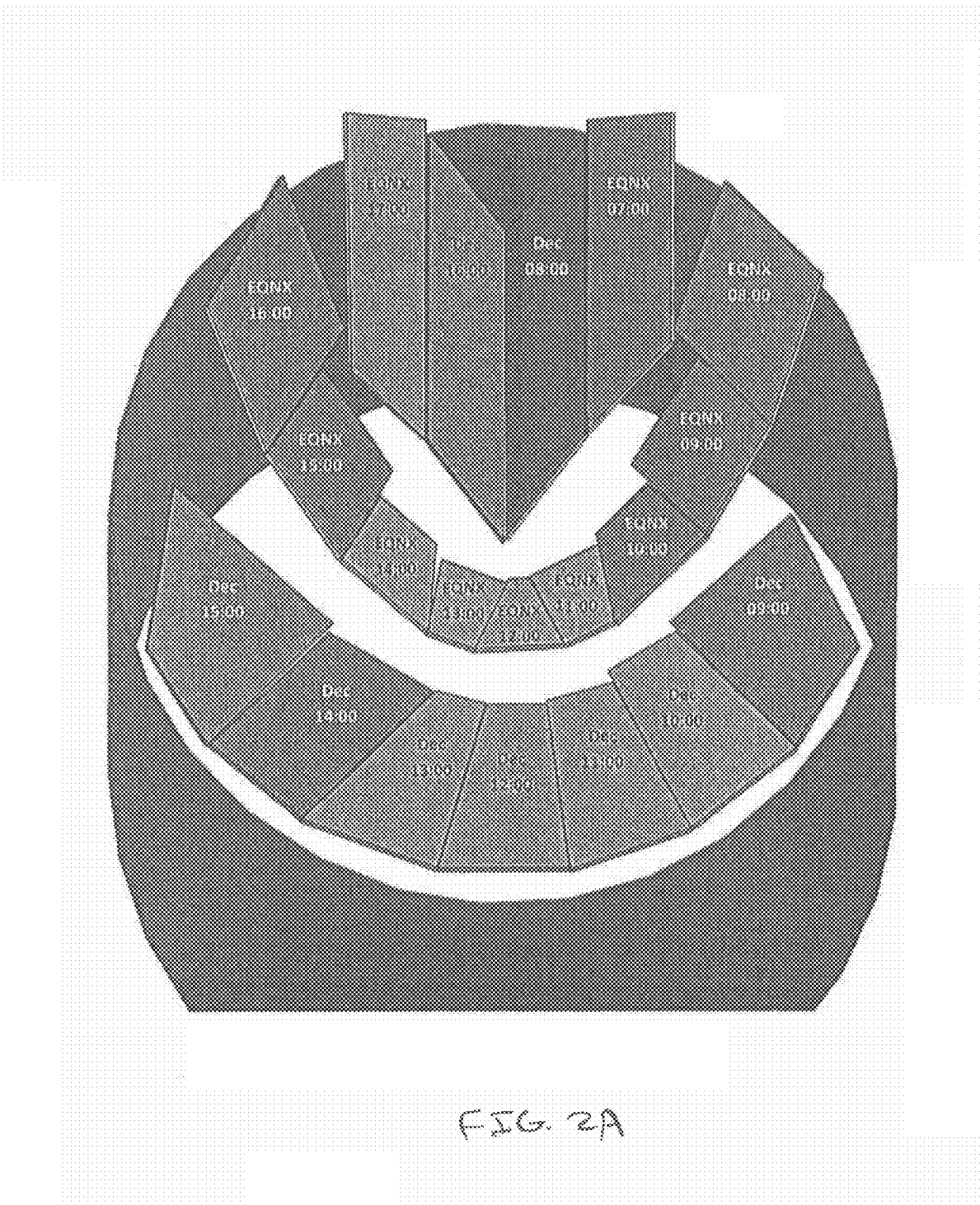
FIGS. 2A-2B depict a solar collector assembly in accordance with an embodiment of the invention.

More specifically, with reference to FIG. 2A, in this embodiment, each of the reflectors 16 can be optimized to direct incident sunlight, e.g., at least 90 percent and preferably 100 percent of the incident light energy, into the light pipe along a direction substantially parallel to the light pipe's optical axis for a different hour of the day (e.g., the hours shown in FIG. 2A) for winter solstice and spring/fall equinox for a reference location, such as Denver, Co., U.S.A. In this embodiment, each of the reflectors is titled relative to the optical axis (OA) with a tilt angle in a range of about 25 degrees to about 50 degrees. Further, the angle between two adjacent reflectors 16 is in a range of about 8 degrees to about 28 degrees.

Figure 5:
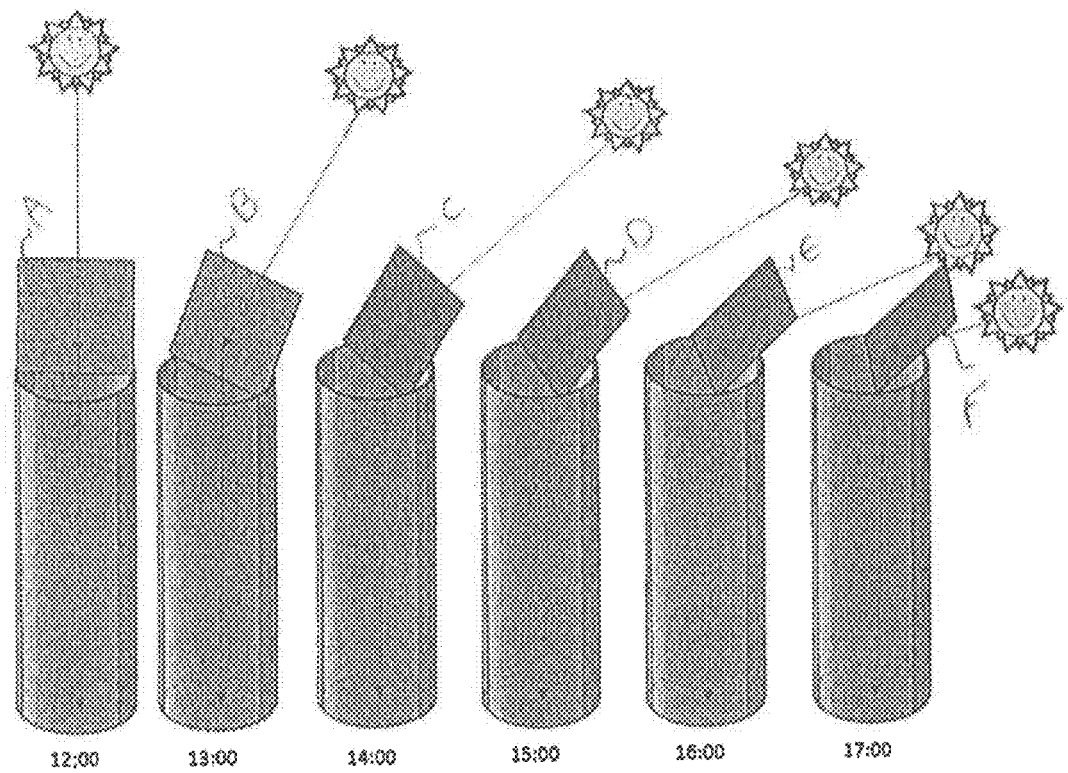
FIG. 5 depicts a sequence of solar collectors at differing times of the day in accordance with an embodiment of the invention.

By way of further illustration of the operation of the reflector array 16, FIG. 5 schematically shows a plurality of mirrors (A, B, C, D, E, and F), such as the reflectors 16, that are positioned directly above a light tube in order to have line-of-sight to a diffuser disposed at the distal end of the light pipe. Each mirror is configured to direct the incident sunlight into the light pipe along a direction substantially parallel to the optical axis of the light pipe for different hours of daylight, e.g., from 12 pm to 5 pm on an Equinox day in Denver, Co. Each mirror in this array is dedicated to one hour of the day in that it directs the light incident thereon during that hour into the light pipe substantially parallel to the optical axis. For example, the altitude angle and azimuth (longitude, or compass) angle of each mirror is optimized to direct the sunlight to the center of a diffuser disposed at the distal end of the light pipe.

Referring again to FIGS. 1A, 1B, 1C, 1D, 2A and 2B, the middle row array 18, which is disposed at a higher elevation than the reflectors 16 relative to the proximal end of the light pipe, includes reflectors 18a, 18b, 18c, 18d, 18e, 18g, 18h, and 18i, each of which is configured to reflect the incident sunlight, e.g., at least about 80 percent, or at least about 90 percent, and preferably 100 percent of the incident light energy, during a different time interval of a spring/fall day into the light pipe 16 substantially parallel to the optical axis (OA). Similar to the reflectors 16, the specularly reflective surface of each reflector 18 is in the form of a flat mirror having a front specularly reflective surface and a back surface that provides diffuse reflection of the incident light. In other embodiments, the specularly reflective surface of each reflector 18 can be in the form of a slightly convex surface, e.g., one having a radius of curvature in a range of about 3 inches to about 10 inches.

As the flux density of sunlight incident on the middle row reflectors during spring/fall is on average greater than the respective incident sunlight flux density on the bottom reflectors, the middle row reflectors have smaller sizes than those of the bottom row reflectors to ensure that the total flux of the incident sunlight that is directed into the light pipe is preferably substantially similar to the respective flux density directed into the light pipe by the bottom row reflectors. As discussed in more detail, this ensures that the solar collector would exhibit a substantially flat daylight lumens curve during spring/fall and winter months.

By way of further illustration, in this embodiment, each of the reflectors 16 can be optimized to direct incident sunlight, e.g., at least about 90 percent and preferably 100 percent of the incident light energy, into the light pipe along a direction substantially parallel to the light pipe's optical axis for a different hour of the day (e.g., the hours shown in FIG. 2A) for fall/spring equinox at the aforementioned reference location, i.e., Denver, Co., U.S.A.

The tilt angle of each reflector 18 relative to the optical axis (OA) as well as the angle between two adjacent reflectors 18 can be selected in a manner discussed above in connection with the reflectors 16. In this embodiment, each of the reflectors 18 is tilted relative to the optical axis (OA) with a tilt angle in a range of about 25 degrees to about 50 degrees (the tilt angle is defined as above). Further, in this embodiment, the reflectors 18 are positioned relative to one another such that an angle between any two adjacent reflectors is in a range of about 8 degrees to about 28 degrees (the angle between the reflectors is defined the same way as discussed above in connection with reflectors 16).

With continued reference to FIGS. 1A, 1B, 1C, 1D, 2A and 2B, the top reflector array, which is positioned at a higher elevation than the middle reflectors 18, includes two pairs of reflectors, where one pair is configured for directing incident sunlight into the light pipe along a direction substantially parallel to the optical axis (OA) in spring and fall while the other pair is configured for such direction of the incident sunlight into the light pipe in the winter. Similar to the bottom and middle reflectors, each of the reflectors 20 includes a front specularly reflective surface and a back surface for diffuse reflection of the incident sunlight. In this embodiment, the reflective surfaces of reflectors 20 are in the form of flat mirrors while in other embodiments one or more of the reflectors 20 can have a slightly convex surface.

More specifically, as shown in FIG. 2A, in this embodiment, reflectors 20a and 20b are configured to reflect incident spring/fall equinox sunlight, e.g., at least about 80 percent, or at least about 90 percent, and preferably 100 percent of the incident light energy, into the light pipe 12 in a direction substantially parallel to the optical axis (OA) during the hours shown in FIG. 2A. Reflectors 20c and 20d are in turn configured to reflect incident winter solstice sunlight, e.g., at least about 80 percent, or at least about 90 percent, and preferably 100 percent of the incident light energy, into the light pipe 12 in a direction substantially parallel to the optical axis (OA) during the hours shown in FIG. 2A.

Again, the tilt angles of the reflectors 20 relative to the optical axis (OA) as well as the positions of these reflectors about the optical axis (OA) are selected in a manner discussed above in connection with the reflectors 16 and 18 so that the reflectors 20 would direct the incident sunlight into the light pipe as discussed above. By way of example, in this embodiment, the reflectors 20 are positioned relative to one another such that an angle between any two adjacent reflectors is in a range of about 8 degrees to about 28 degrees (the angle between the reflectors is defined the same way as discussed above in connection with reflectors 16). Further, each of the reflectors 20 is titled relative to the optical axis (OA) with a tilt angle in a range of about 25 degrees to about 50 degrees (the tilt angle is define as above).

Figure 2B:
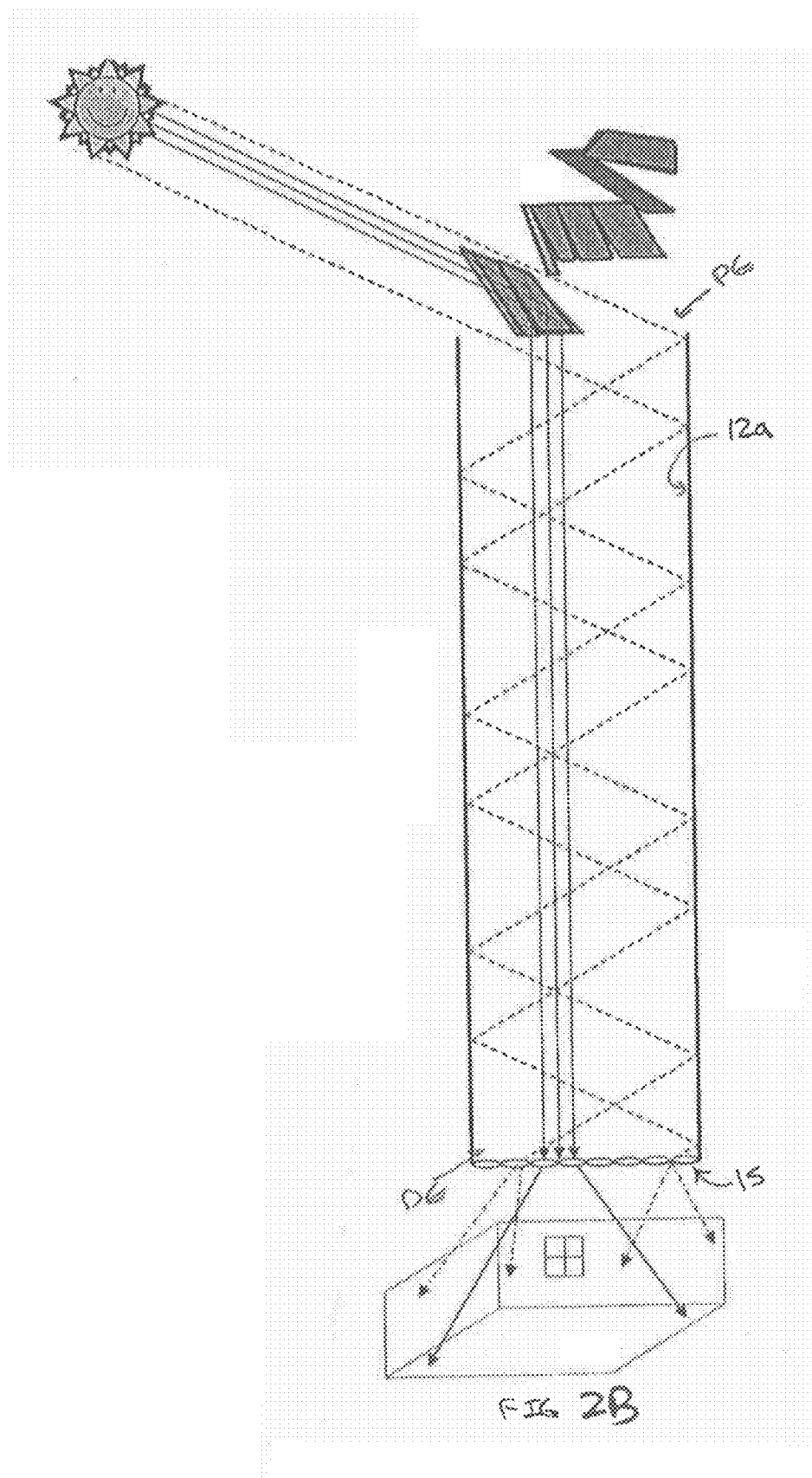

By way of further illustration, FIG. 2B shows one of more reflectors 16 reflecting the incident sunlight directly at the bottom diffuser 15, which is composed of a beam shaping lens array, as a substantially collimated beam (solid lines) for a given position of the sun. In contrast, the sunlight that enters the light pipe directly, will reach the diffuser as an omnidirectional light (dotted lines). The collimated light reaching the diffuser can be effectively controlled/shaped by the diffuser to accurately illuminate the target area (e.g., the floor of a room), whereas the omnidirectional light (dotted lines) cannot be accurately controlled by the diffuser. For example, the resulting light distribution after passage of the omnidirectional light through the diffuser may be very wide, thus illuminating the walls of the room as well as its floor.

In this illustrative embodiment, the positions, including positions and the sizes of the bottom middle and top reflectors are selected so as to provide a substantially flat daylight-lumens curve (e.g., a curve in which the luminosity of light reflected off the reflectors/mirrors and exiting the distal end of the light pipe varies by less than about 20%). Specifically, in the above embodiment, each reflector is sized in proportion to the strength/irradiance of the incident sunlight during the periods (season/time of the day) in which the reflector efficiently directs the incident light into the light pipe (e.g., it reflects the incident light into the light pipe substantially parallel to its optical axis).

Figure 6:
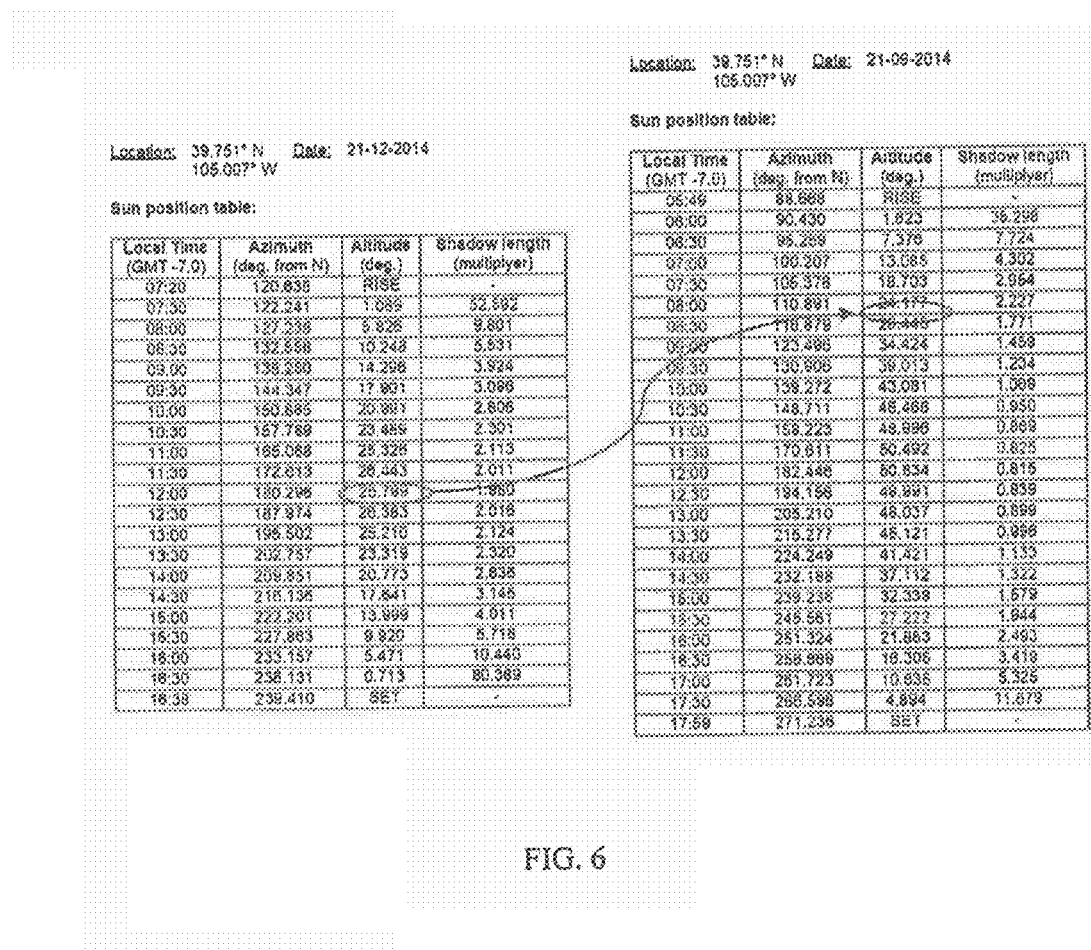
FIG. 6 depicts a winter solstice curve.

The strength/irradiance of sun's radiation is a function of the sun's altitude (angle above the horizon) and the distance from the earth to the sun. Low altitude sunlight is reduced by the earth's atmosphere; at sunrise and sunset (sun altitude=0 degrees) there is roughly 30 times more atmosphere for the light to pass through as compared to when the sun is directly above (sun altitude=90 degrees). For example, as shown in FIG. 6, on the winter solstice curve in Denver Colo., U.S.A., the noon-time sun is about 26.8 degrees above the horizon (solar "altitude"), which is about the same as the equinox altitude at 8:20 am. Hence, in some implementations, the size of the reflector adapted to reflect efficiently the sunlight for winter solstice noon into the light pipe can be slightly less than the size of a reflector adapted to reflect efficiently the sunlight for Equinox 8:00 am.

Figure 7:
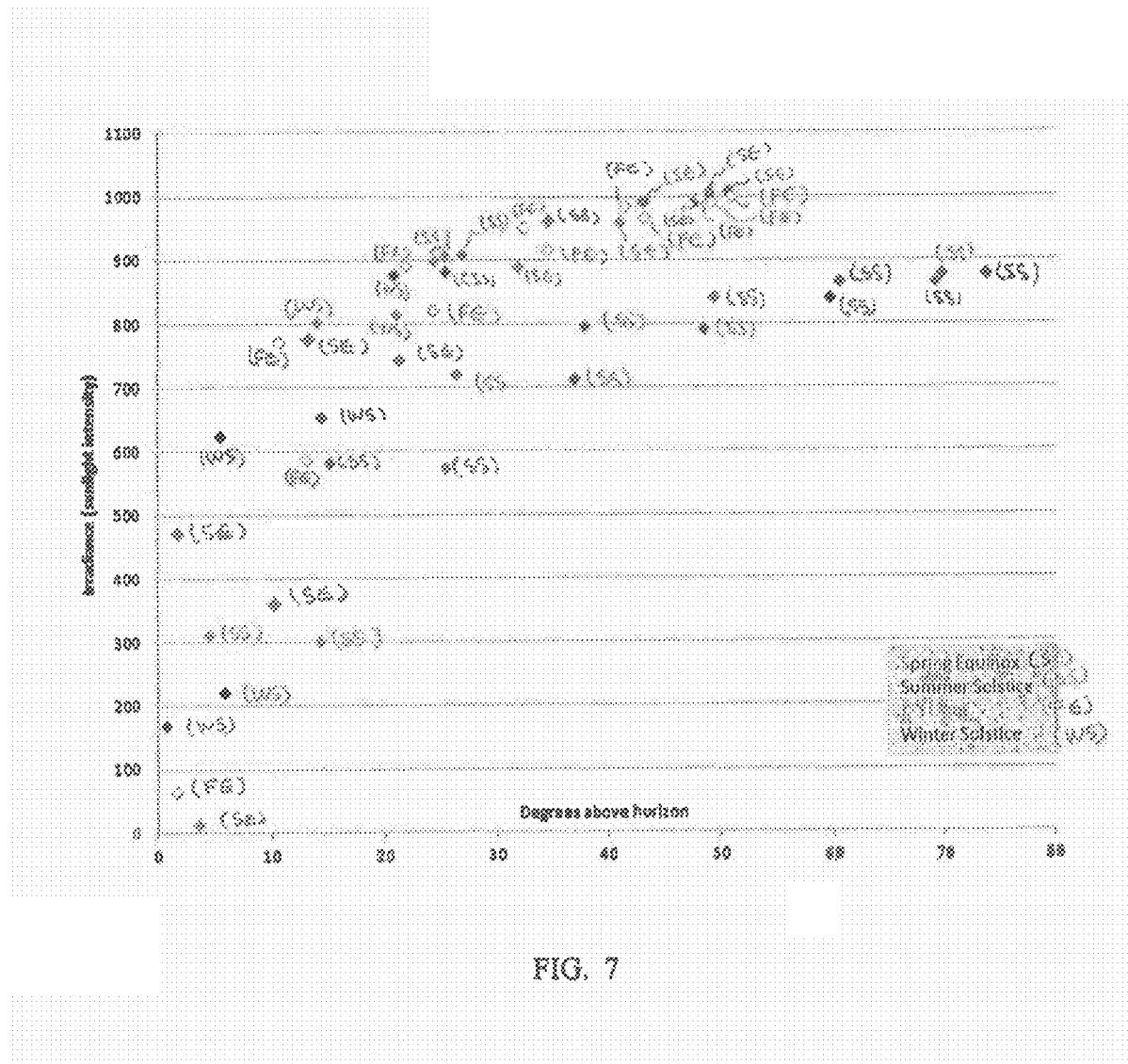
FIG. 7 depicts a graph of sunlight intensity vs. sun altitude angle (hourly) for equinox and solstice dates in accordance with an embodiment of the invention.

In addition to atmospheric effects, the sun's intensity is also a function of its distance from the earth. The net resulting intensity (irradiance) is available from the National Renewable Energy laboratory (NREL) data (http://rredc.nrel.gov/solar/old_data/nsrdb). By way of example, FIG. 7 shows sunlight intensity vs. sun altitude angle (hourly) for equinox and solstice dates, showing the effect of altitude angle as well as seasonal earth-sun distance.

Figure 1C:
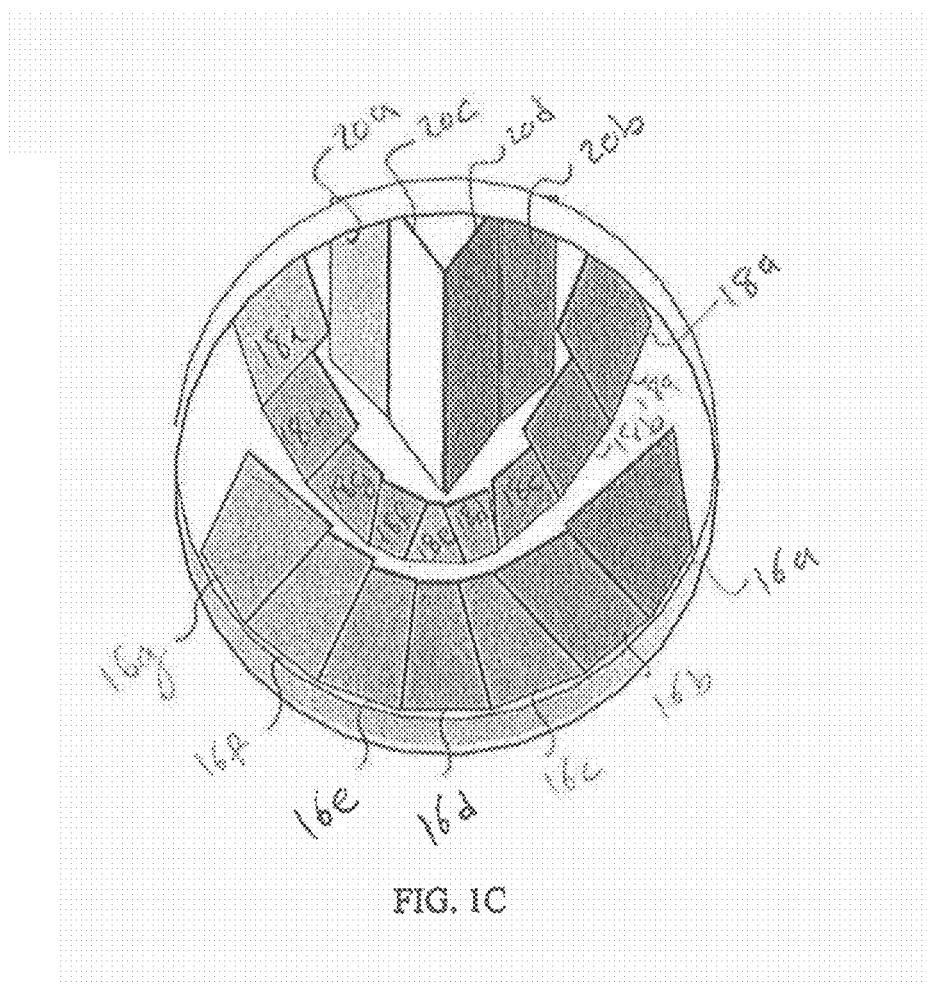
Figure 1D:
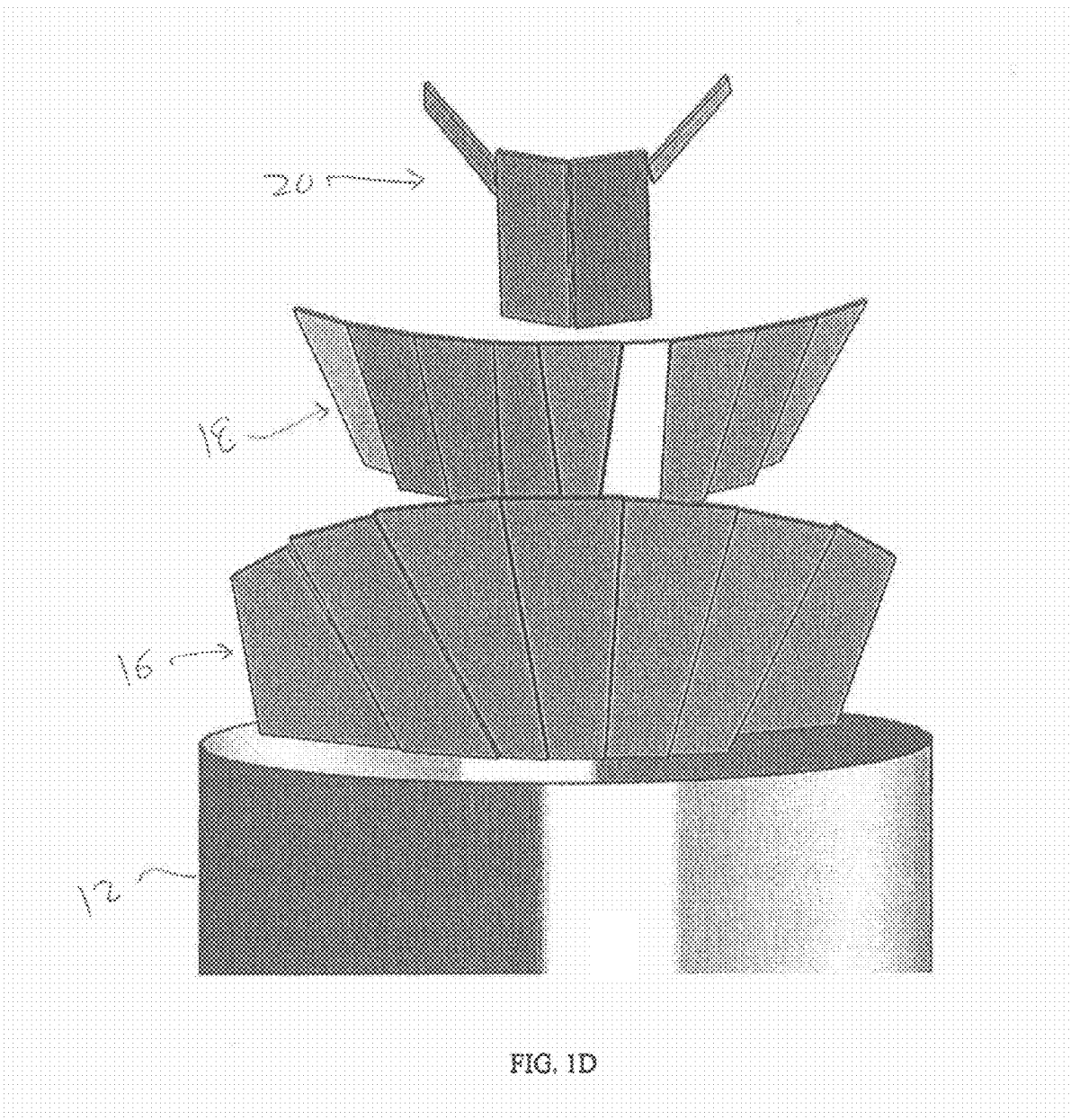

The diffusely reflective back surfaces of the reflectors reflect the incident sunlight away from the light pipe so as to block a portion of the sunlight from entering the light pipe when the sun is high in the sky (i.e., for high altitude angles). For example, FIG. 1C schematically depicts that a large fraction of the proximal opening of the light pipe is blocked by the back surfaces of the reflectors during mid-day in June/July. Such blocking of a portion of the sunlight during time intervals of high sun irradiance can further facilitate obtaining a substantially flat daylight-lumens curve.

Thus, the combination of the sizes of the specularly reflective surfaces of the reflectors and the blockage of the sunlight by the back surfaces of the reflector allow substantially flattening the daylight lumens response curve daily and seasonally. Such a flat daylight-lumens curve results in a substantially constant light luminosity incident on the diffuser 15, which can in turn be desirable in a variety of lighting applications.

Figure 8:
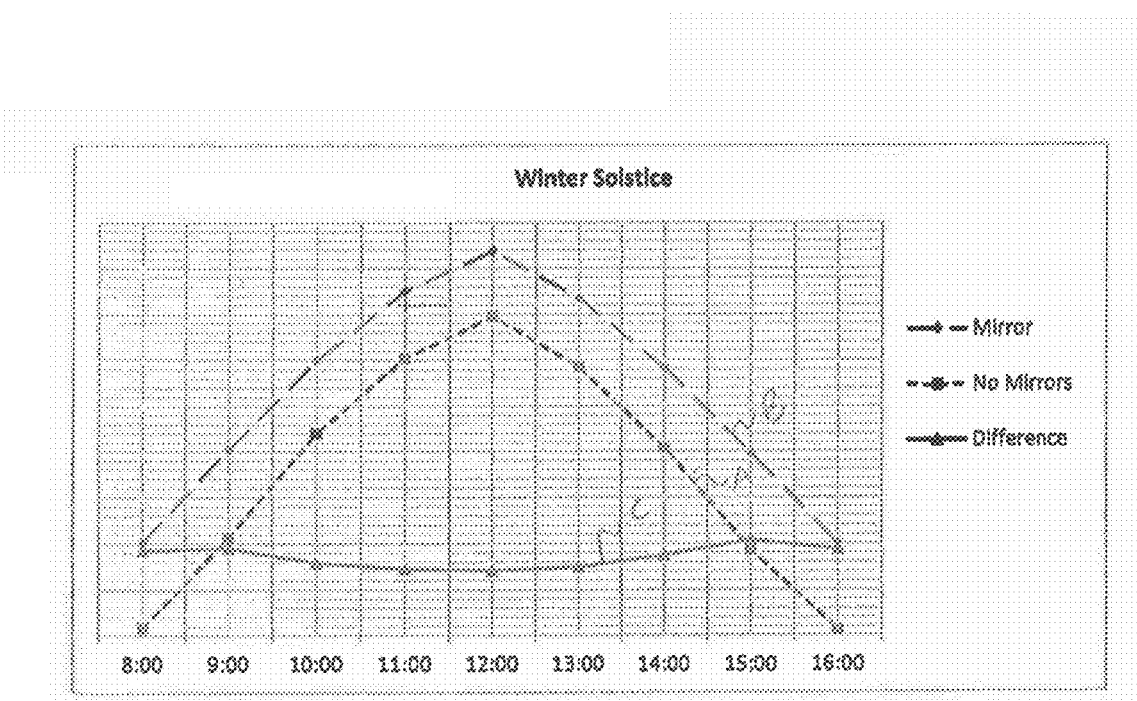
FIG. 8 depicts theoretically simulated light intensity in accordance with an embodiment of the invention.

FIG. 8 shows the results of theoretically simulated light intensity delivered to the bottom diffuser for each hour of December $21^{st}$ in Denver, Co. for the following two system model: (i) light tube alone (all mirrors configured as absorbing), and (ii) mirrors enabled (one mirror at-a-time configured as reflective and all others as non-reflective). Curve A shows the results of the simulations for system (i) and curve B shows the results of simulation for system (ii). The difference curve (C) is the mathematical difference between curves A and B, and represents the collimated light delivered to the bottom diffuser by the reflector system. Curve C shows that the intensity of the light delivered to the diffuser via the reflectors according to the present teachings is highly consistent throughout the day, thus enabling the diffuser to provide consistent illumination to the target surface (e.g., floor).

Although in the above embodiment each reflector is configured to efficiently direct the incident sunlight into the light pipe during one hour of the daylight, in other embodiments the time interval during which a reflector would direct the incident sunlight into the light pipe substantially parallel to its optical axis can be less or more than one hour. In principle, any time interval can be chosen based, e.g., on the requirements of a particular application.

In some embodiments, rather using discrete mirrors, a smooth reflective surface can be employed to direct light efficiently into the light pipe in accordance with the present teachings. By way of example, the specularly reflective surfaces of any of reflector arrays can be turned into a smooth 3D (three-dimensional) space curve, e.g., such that the radius of curvature at each point of the 3D space curve is a function of the size of the reflector's specular reflective surface.

The 3D space curve can be calculated mathematically and/or with surface-modeling software. By way of example, a suitable surface-modeling software is marketed by Robert McNeel & Associates of Seattle, Wash., U.S.A. under the trade designation Rhinoceros.

Figure 9A:
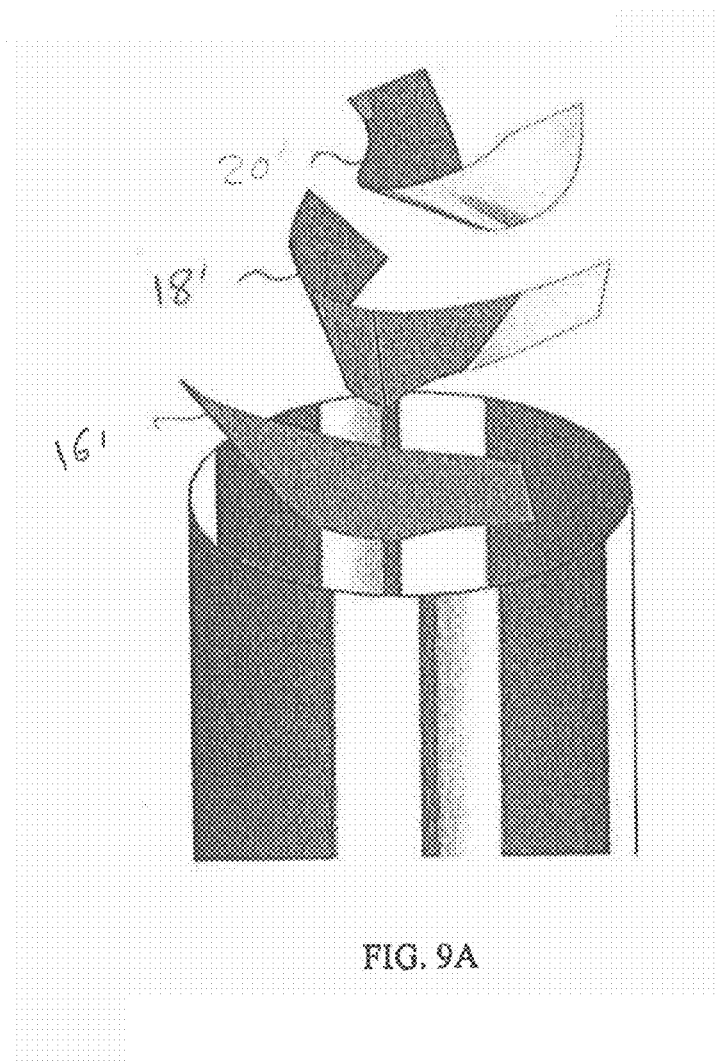
FIGS. 9A-C depict solar collectors in accordance with an embodiment of the invention.
Figure 9B:
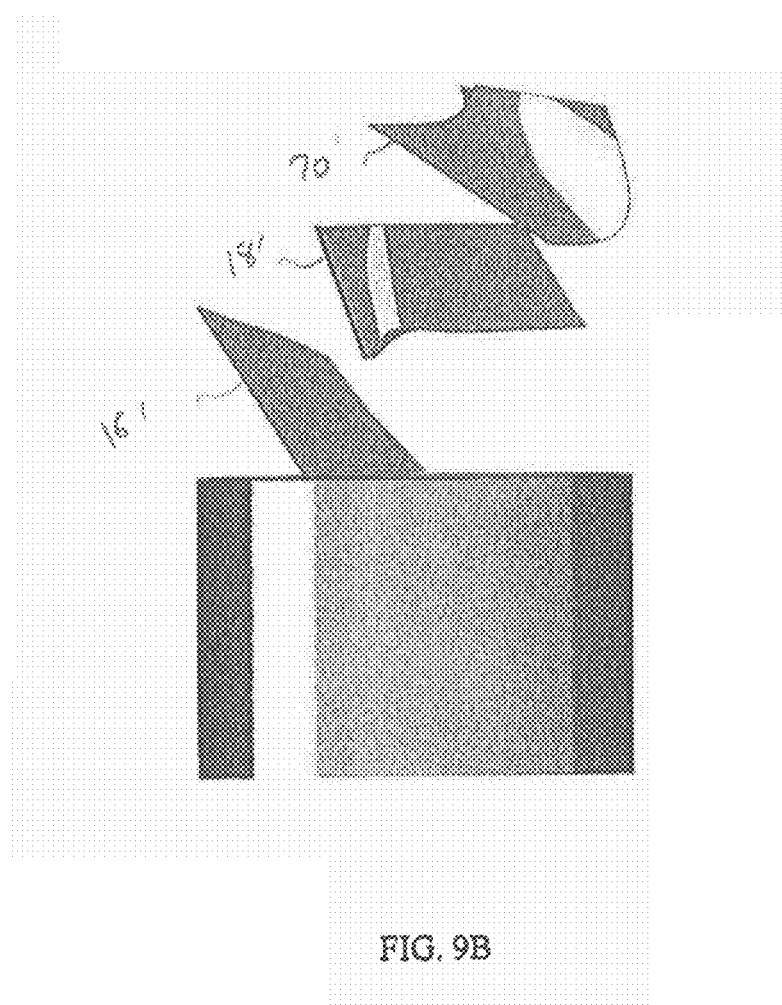
Figure 9C:
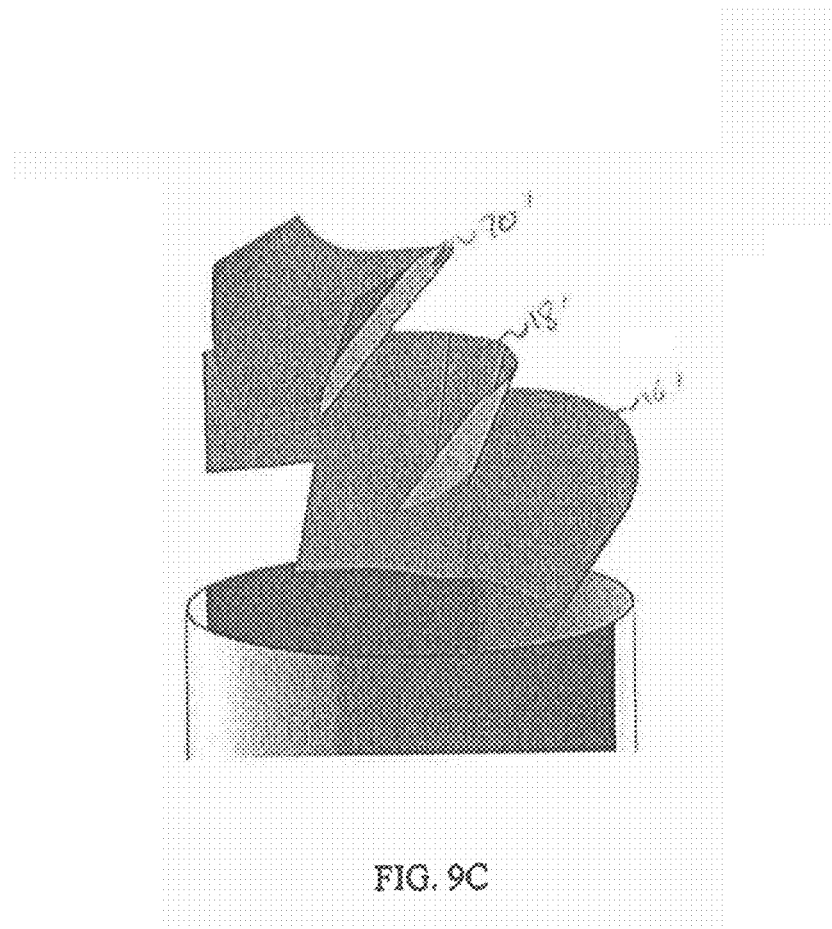

By way of example, FIGS. 9A, 9B, and 9C schematically show three 3D-space reflective curves (surfaces) 16', 18' and 20' that can be obtained by mathematically smoothing the faceted design of the reflectors 16, 18 and 20, respectively, discussed above. Such 3D-space surfaces can provide a greater temporal resolution for directing the incident sunlight during different times of the day into the light pipe substantially parallel to its optical axis via different portions of the surface.

Figure 10:
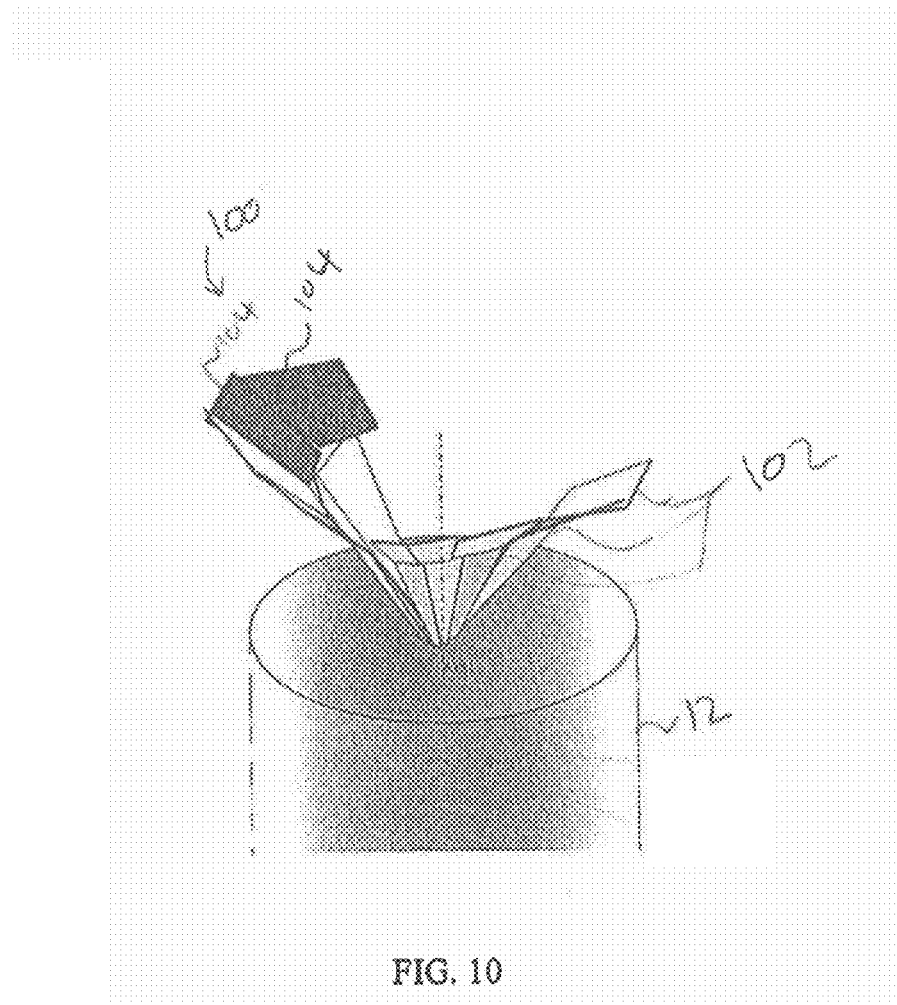
FIG. 10 depicts a solar collector in accordance with an embodiment of the invention.

The solar collectors according to the present teachings are not limited to the solar collector 10 discussed above. For example, the reflectors of the solar collector can be positioned relative to one another to form a contiguous reflective surface. By way of another example, FIG. 10 schematically depicts a solar collector 100 according to another embodiment, which includes a plurality of reflectors 102 for specularly reflecting the incident sunlight into the light pipe 12. Similar to the previous embodiment, each reflector is configured to reflect the light into the light pipe substantially parallel to the optical axis (OA) during a selected time interval of the day in one or more seasons for a given reference location. The solar collector 100 further includes a plurality of reflectors, such as reflectors 104 that include non-specular (e.g., matted) reflective surfaces to block/reflect away the incident light for high altitude positions of the sun (e.g., mid-day sun).

Figure 11:
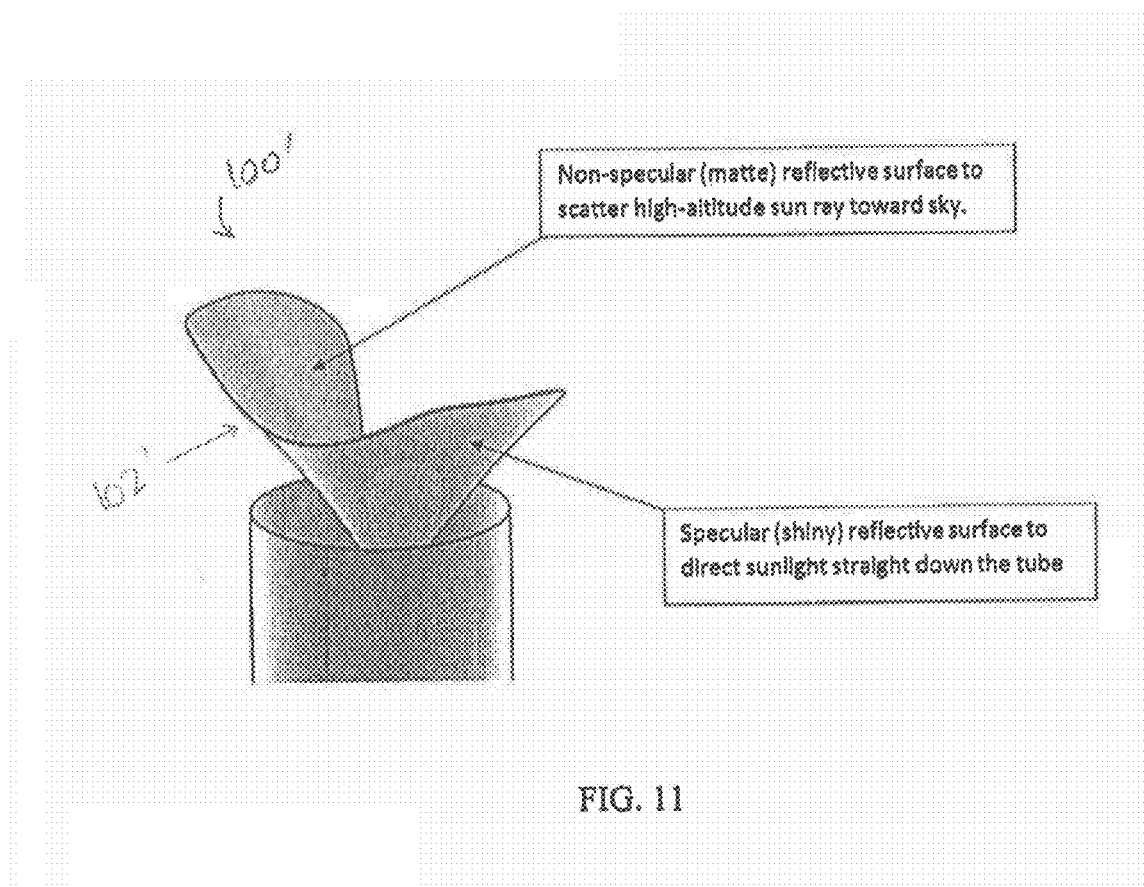
FIG. 11 depicts a solar collector in accordance with an embodiment of the invention.
Figure 12A:
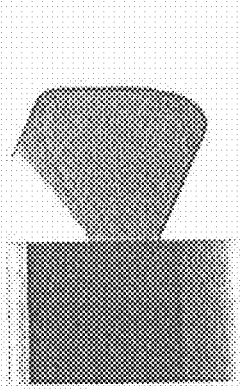
FIGS. 12A-F depict a solar collector in accordance with an embodiment of the invention.
Figure 12B:
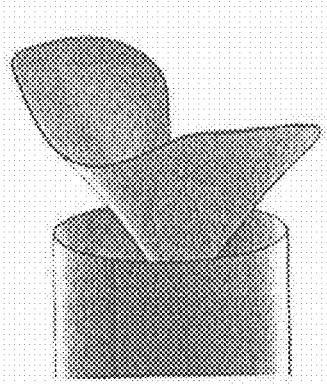
Figure 12C:
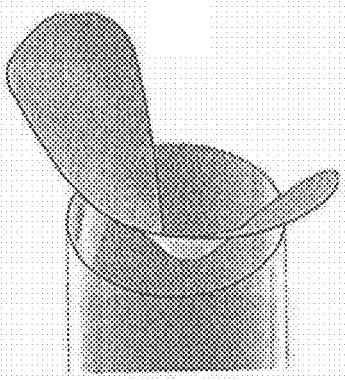
Figure 12D:
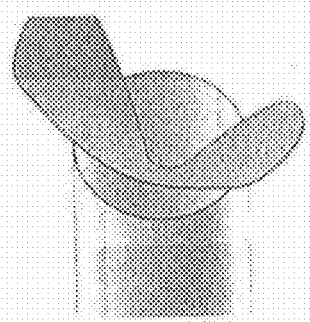
Figure 12E:
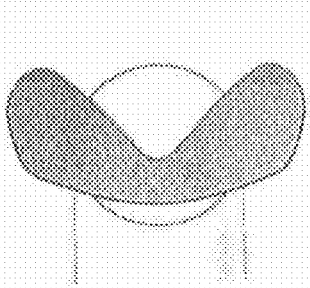
Figure 12F:
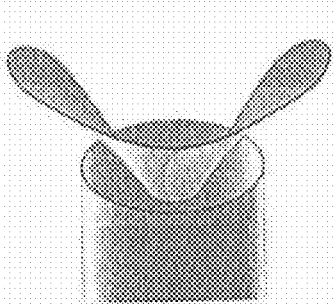

By way of further illustration, FIG. 11 schematically depicts a solar collector 100' that includes a smooth reflective surface 102', which is a 3D space curve obtained by smoothing the faceted reflective surface of the discrete reflectors of the above solar collector 100. As noted above and by of example, the smooth surface of the solar collector 100 can be modeled by employing a modeling software, such as the aforementioned Rhinoceros software. A portion of the smooth surface can act as a specular reflector and another portion of the smooth surface acts as a non-specular reflector according to the present teachings.

With reference to FIGS. 12A, 12B, 12C, 12D, 12E, and 12F, in one implementation of the solar collector 100', the only light entering the light pipe at sunrise in spring/fall is the light reflected by the reflective surface 102'. In early morning in spring/fall, light starts to enter the light pipe directly, but most of the light is reflected by the reflective surface 102' to enter the light pipe. In mid-morning in spring/fall, most of the incident light enters the light pipe directly, but some light is reflected by the reflective surface 102' into the light pipe. In mid-morning in summer, light can enter the light pipe directly, but some light is blocked by the back of the reflector. At noon in summer, light can enter the light pipe directly, but much of the incident light is blocked by the back of the reflector. At noon in winter, some light can enter the light pipe directly, but some light is reflected by the reflective surface 102' to provide efficient illumination of a diffuser disposed at the distal end of the light pipe.

Figure 13:
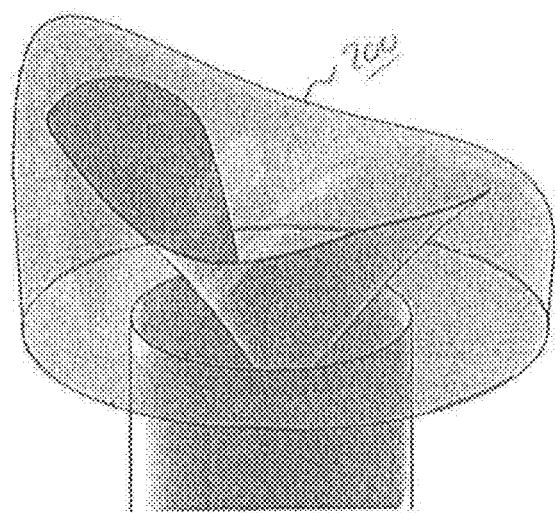
FIG. 13 depicts a solar collector in accordance with an embodiment of the invention.

With reference to FIG. 13, in some embodiments, the solar collector can include a transparent, protective dome 200 for protecting the reflector 100'.

Figure 14A:
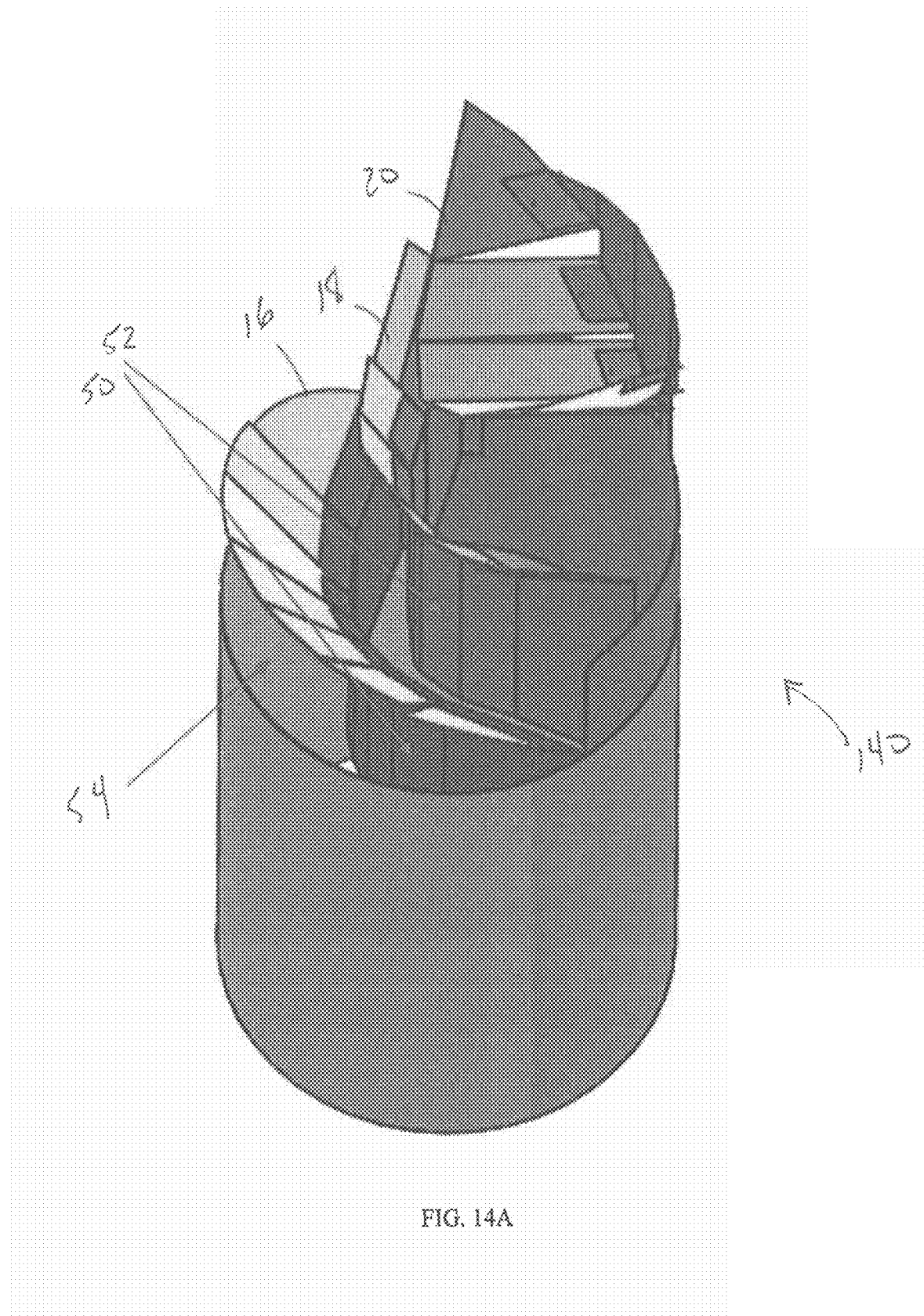
FIGS. 14A-G depict a solar collector in accordance with an embodiment of the invention.

Turning now to FIGS. 14A-G, an embodiment of a solar collector 140 is depicted in which a plurality of baffles are implemented in order to flatten the curve of daylight throughout the daily arc of the sun. While these embodiments attempt to flatten the curve, they may impede significant amounts light from passing through the light pipe. As shown in FIG. 14A, vertical baffles 50 52 are optically coupled to the reflector assemblies 16 and 18. The baffles 50, 52 according to one embodiment, are affixed to the individual reflectors, extending from the proximal end toward the distal end and are substantially parallel to the optical axis of the light pipe. According to one embodiment, the baffles are made from a matte-finish aluminum. While even the matte-finish does provide a degree of reflectivity, the reflection is non-specular (i.e., not mirror-like). The matte-finish is implemented to scatter the light incident on the baffles in order to increase the collimated:non-collimated light ratio by decreasing the non-collimated light (i.e., the denominator of the collimated:non-collimated ratio). It should be appreciated that other non-specular reflective materials may be implemented without deviating from the scope of the invention.

In one embodiment, the inside surface 54 of the reflective tube is specularly reflective. To further increase non-collimated light (and therefor the total lumens) at high sun-angles, such as the viewing angle depicted in FIG. 14A, the baffles 50, 52 may be shortened to allow more sunlight to reach the inside surface of the tube. Embodiments in which shortened baffles are implemented are discussed below.

Figure 14B:
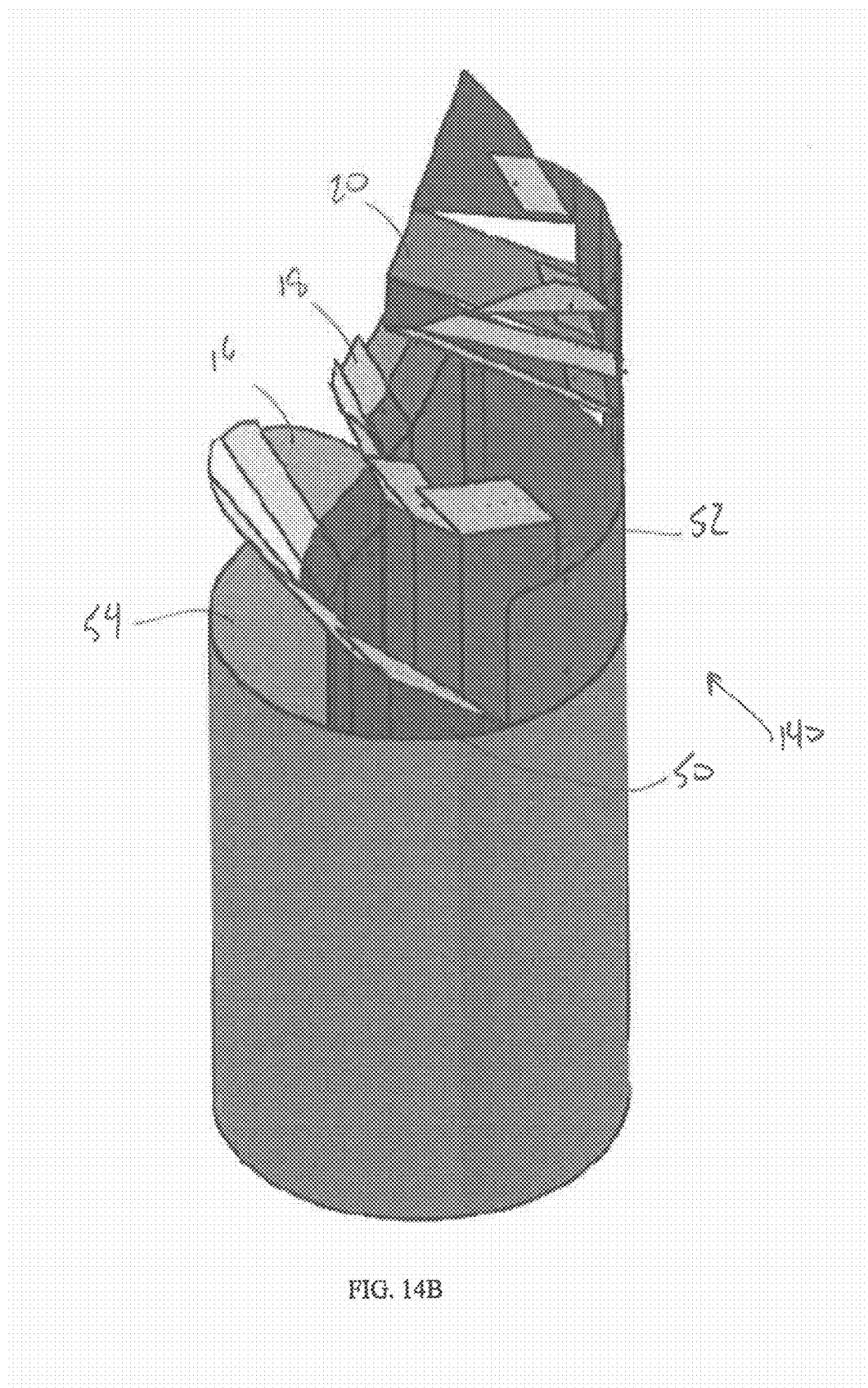
Figure 14C:
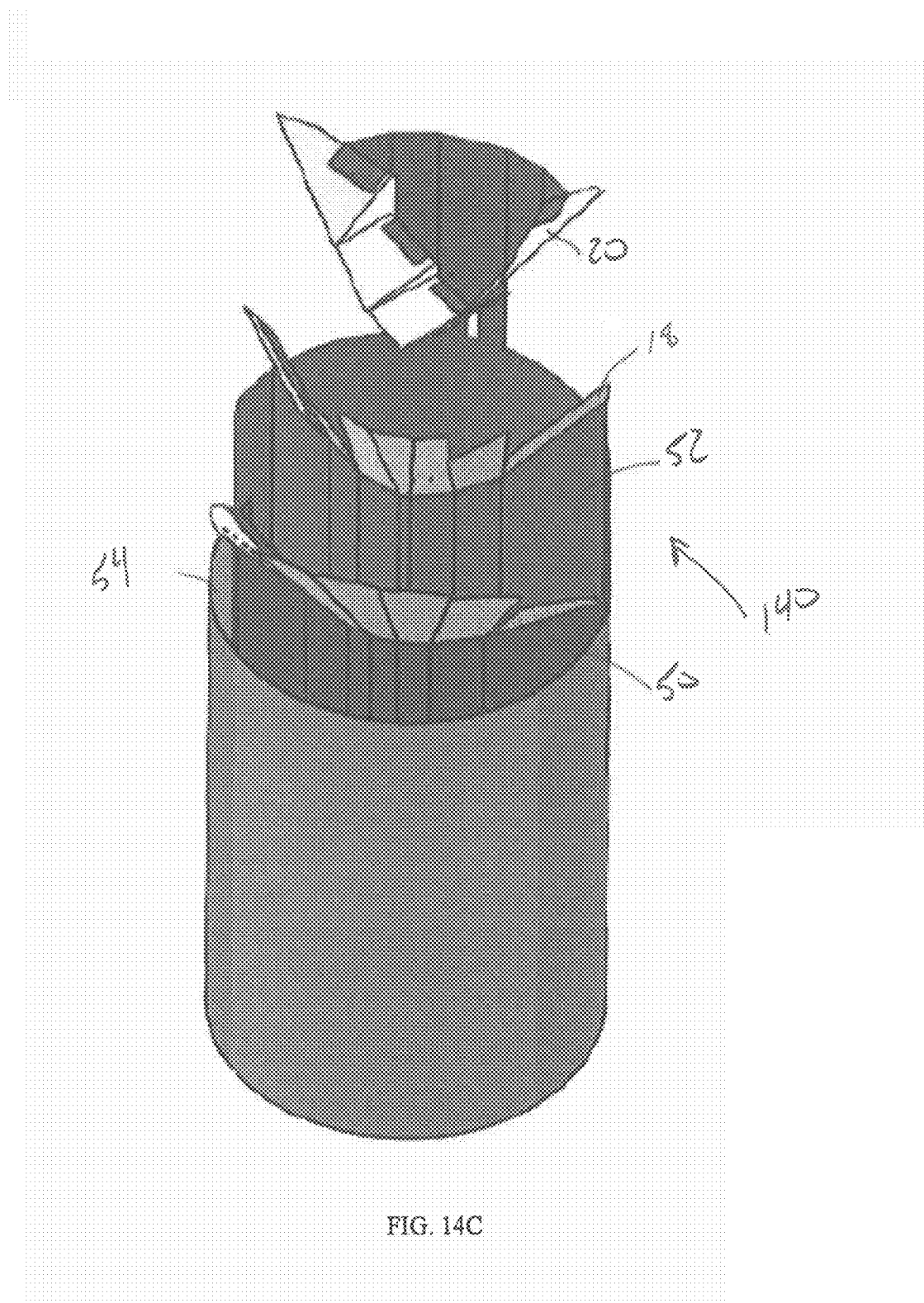
Figure 14D:
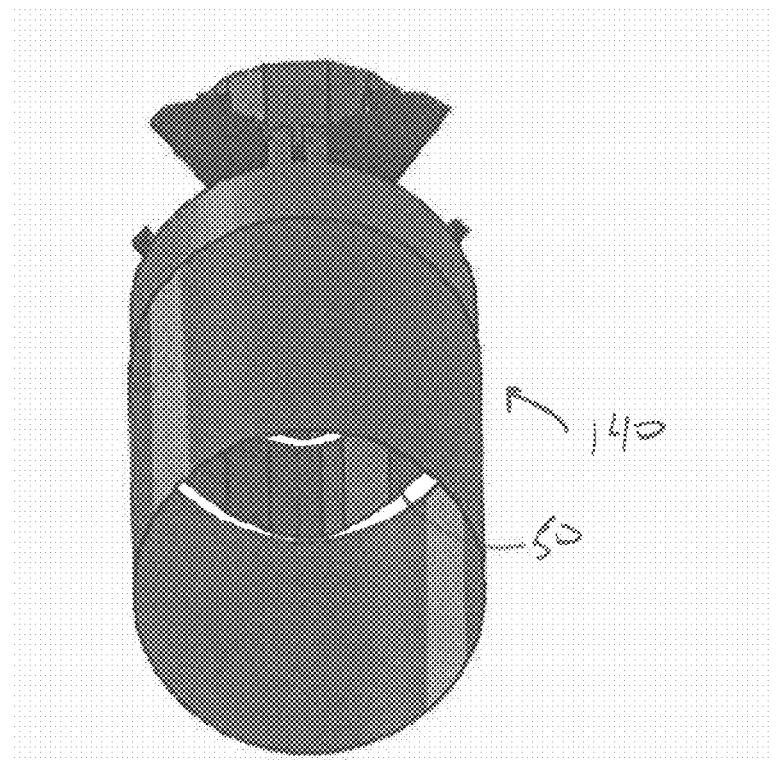
Figure 14E:
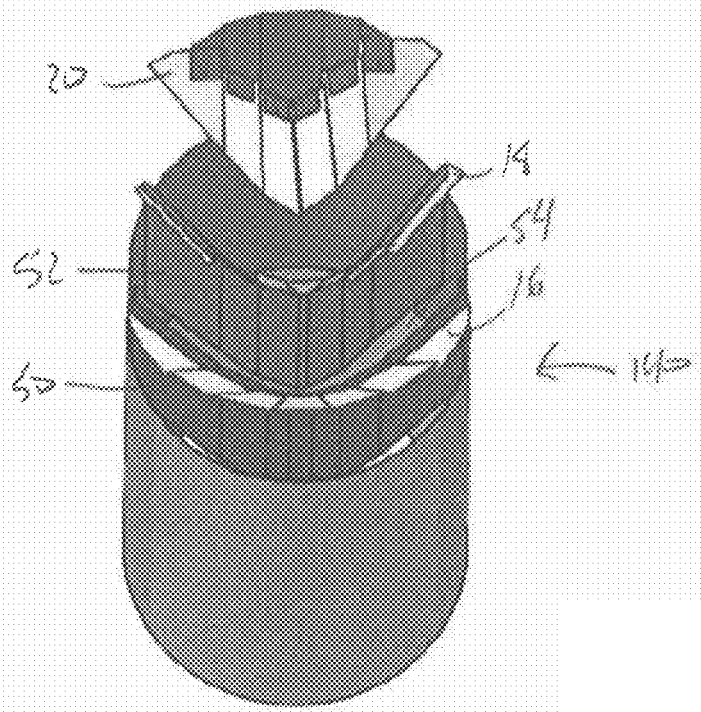

FIGS. 14B and C, respectively, depict viewing angles in which even less of the inside surface 54 is exposed to direct sunlight due to the length of the baffles. As can be seen from the figures, the area of inside surface 54 decreases and the viewing angle (or angle of the sun) rotates around the collector 140. When viewed from below, as depicted in FIG. 14D, the baffles 50 block nearly the entire sky. FIG. 14E depicts the collector from the sun's point-of-view. The specular inside surface 54 is mostly obscured by the vertical baffles 50, 52.

Figure 14F:
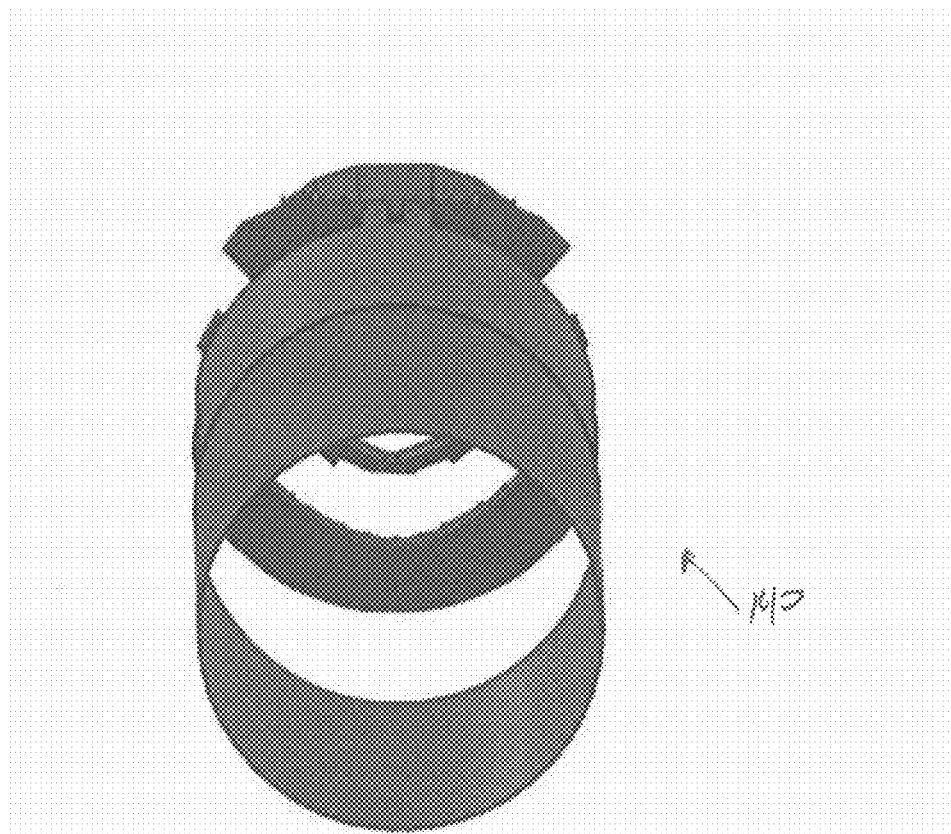
Figure 14G:
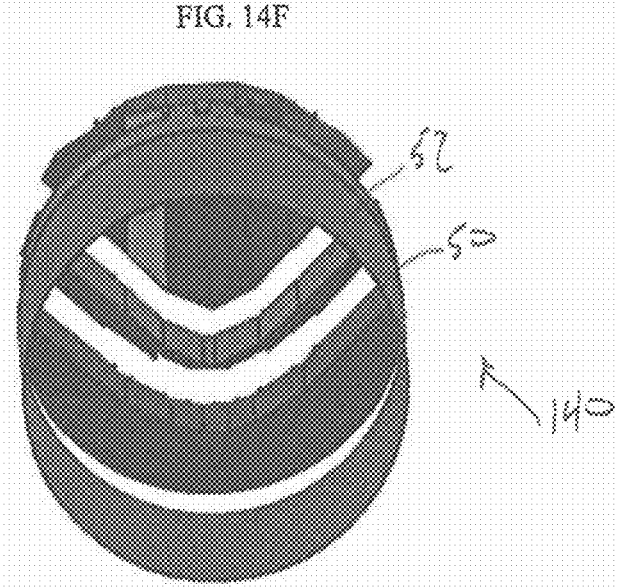

FIG. 14F, a view from the distal end of the collector depicts an embodiment of the solar collector in which the baffles are shortened thereby opening up the view and allowing more direct sunlight to enter the light pipe. At other sun/viewing angles, however, as shown in FIG. 14G, while the baffles are not blocking the sunlight, the reflectors 16, 18, 20 themselves block a significant portion of the direct view of the sun and sky.

Figure 15A:
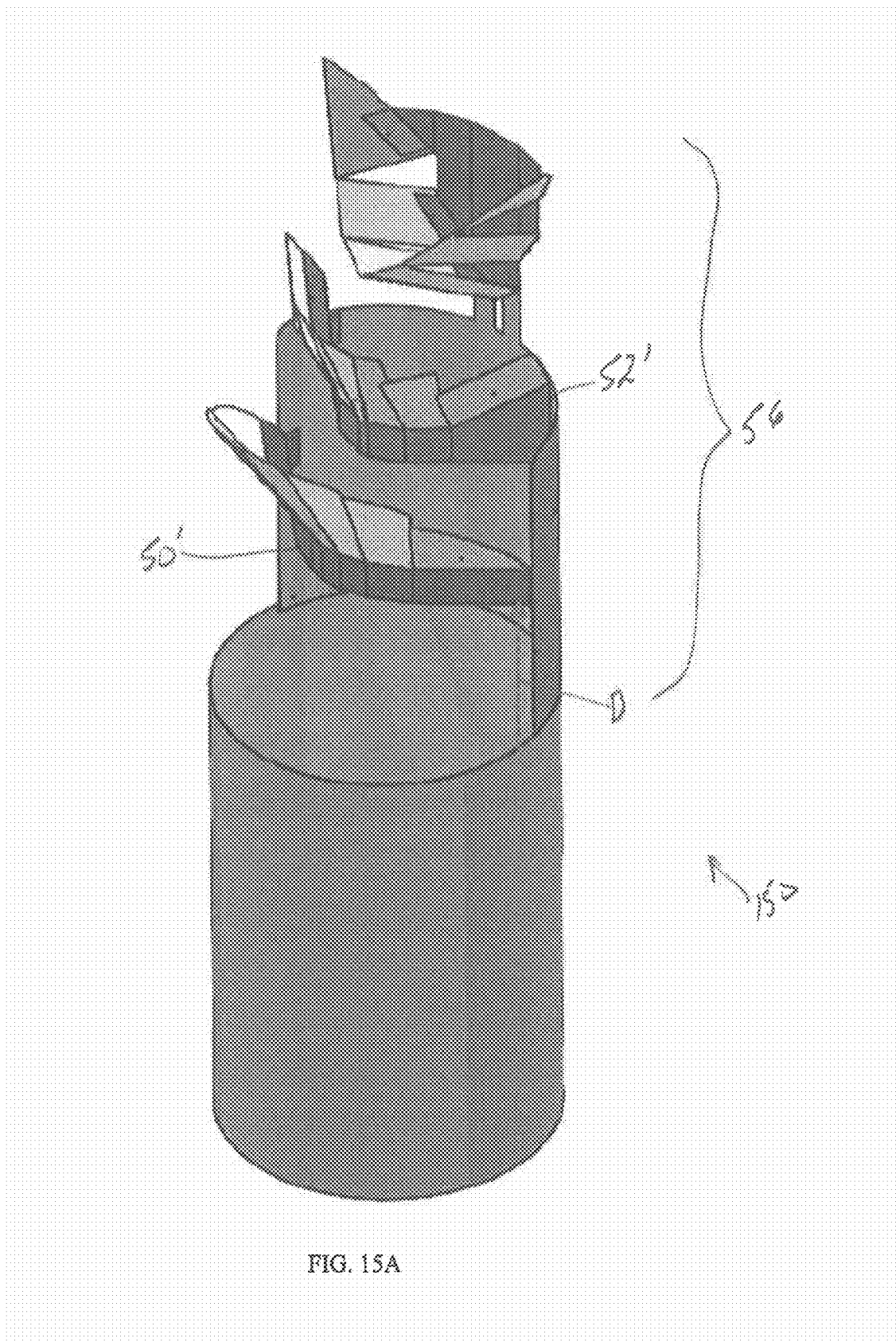
FIGS. 15A-D depicts a solar collector in accordance with an embodiment of the invention.

According to one embodiment of the invention, the reflector array may be raised upward in order to increase the amount of collected light. As shown in FIG. 15A, in one embodiment of a solar collector 150 the mirror array 56, including the reflectors 16, 18, 20 and the baffles 50', 52', is raised by a height D, for example 4-6 inches in one embodiment, above the top of the proximal end of the light pipe. The increased height of the array in combination with shortened baffles 50, 52, provides a substantially unobstructed view or path for sunlight to reach the specular inside surface 54 of the tube. A rear support 58, to which the mirror array is attached, may also be a specularly reflective surface that will further increase the total lumens collected by the light pipe. According to one embodiment, the solar collector assembly is scalable. For example, if the light pipe, which according to one embodiment is about 21 inches diameter in this case, is increased by 2× to 42 inches diameter, all other elements would also be scaled by 2×, including height D in FIG. 15A. Of note, the area of a circle increases as a function of the diameter squared, therefore the 42-inch system would collect, transfer and produce 4× the light of the 21 inch diameter light pipe. Computer simulations have found that although the total sunlight collected, transferred, and produced by an embodiment like that depicted in FIG. 15A increases as "D" increases, the increase begins to diminish after 4 to 6 inches or so (20-30% of the light pipe diameter).

Figure 15B:
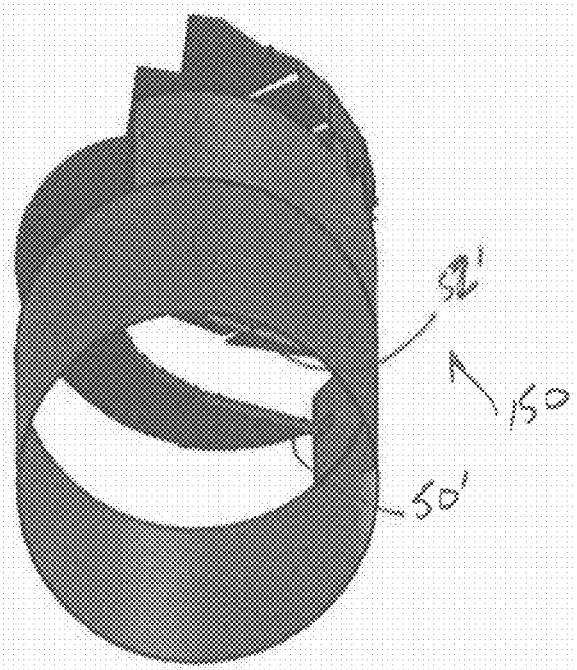
Figure 15C:
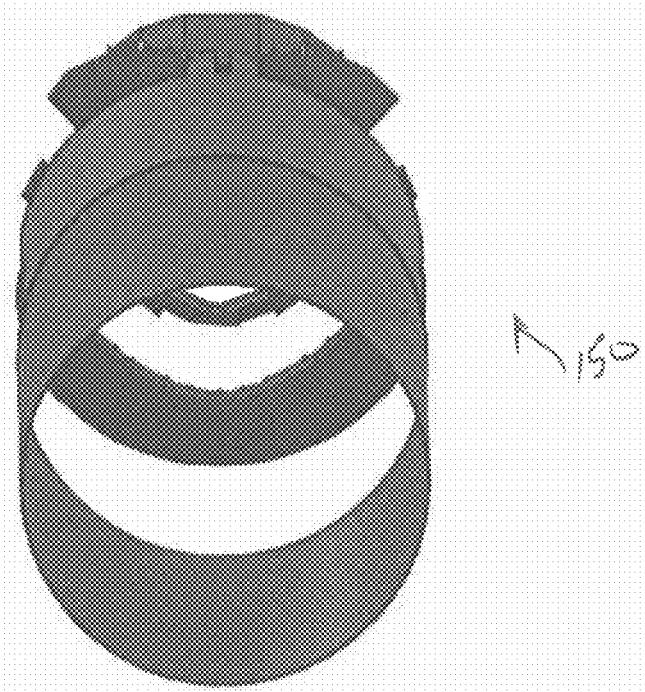
Figure 15D:
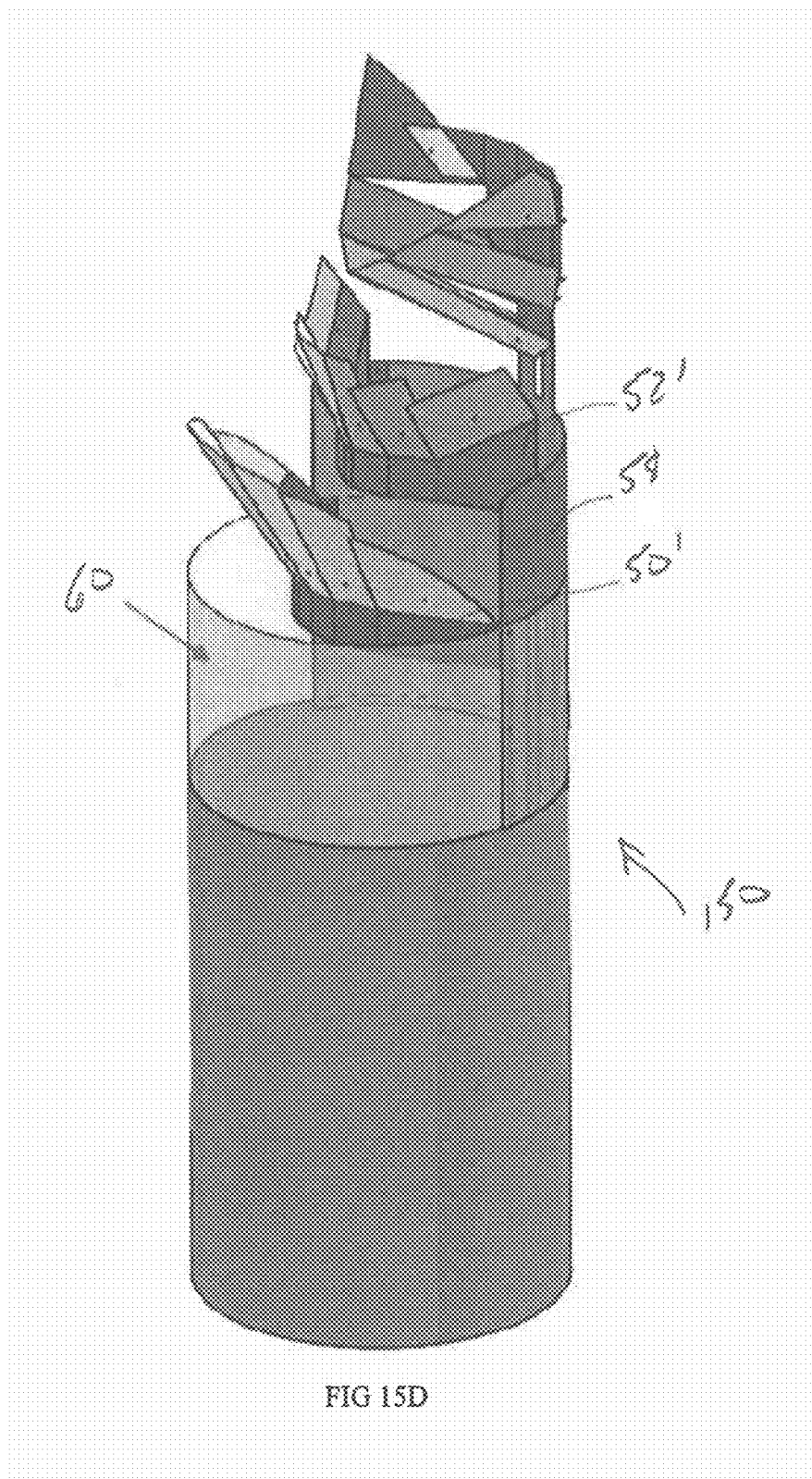

FIGS. 15B and 15C depict reverse-views of the collector shown in FIG. 15A from the bottom of the collector and at different viewing angles. With the raised mirror array 56 and rear support 58, and the shortened baffles 50', 52', show a significant amount of sky (i.e., exposure to direct sunlight).

In yet another embodiment, the solar collector of FIG. 15A further includes a transparent window area 60 disposed around the remaining circumference of the collector from the rear support 58. According to one embodiment, the window area extends about 200 degrees around the circumference of the collector. The transparent surface may be a Fresnel-like surface to improve collection of light through the window surface.

Figure 16A:
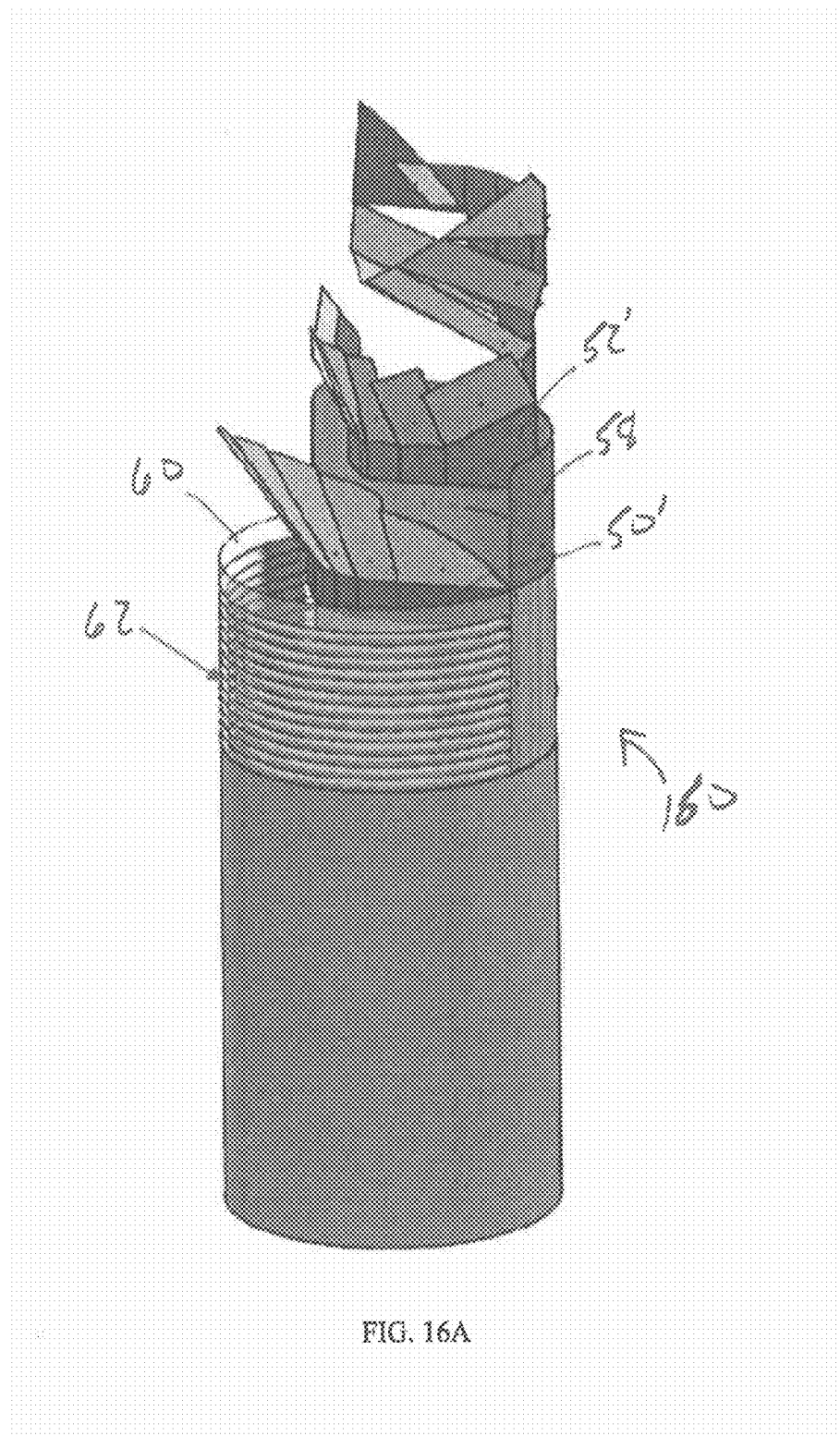
FIGS. 16A-C depict a solar collector in accordance with an embodiment of the invention.
Figure 16B:
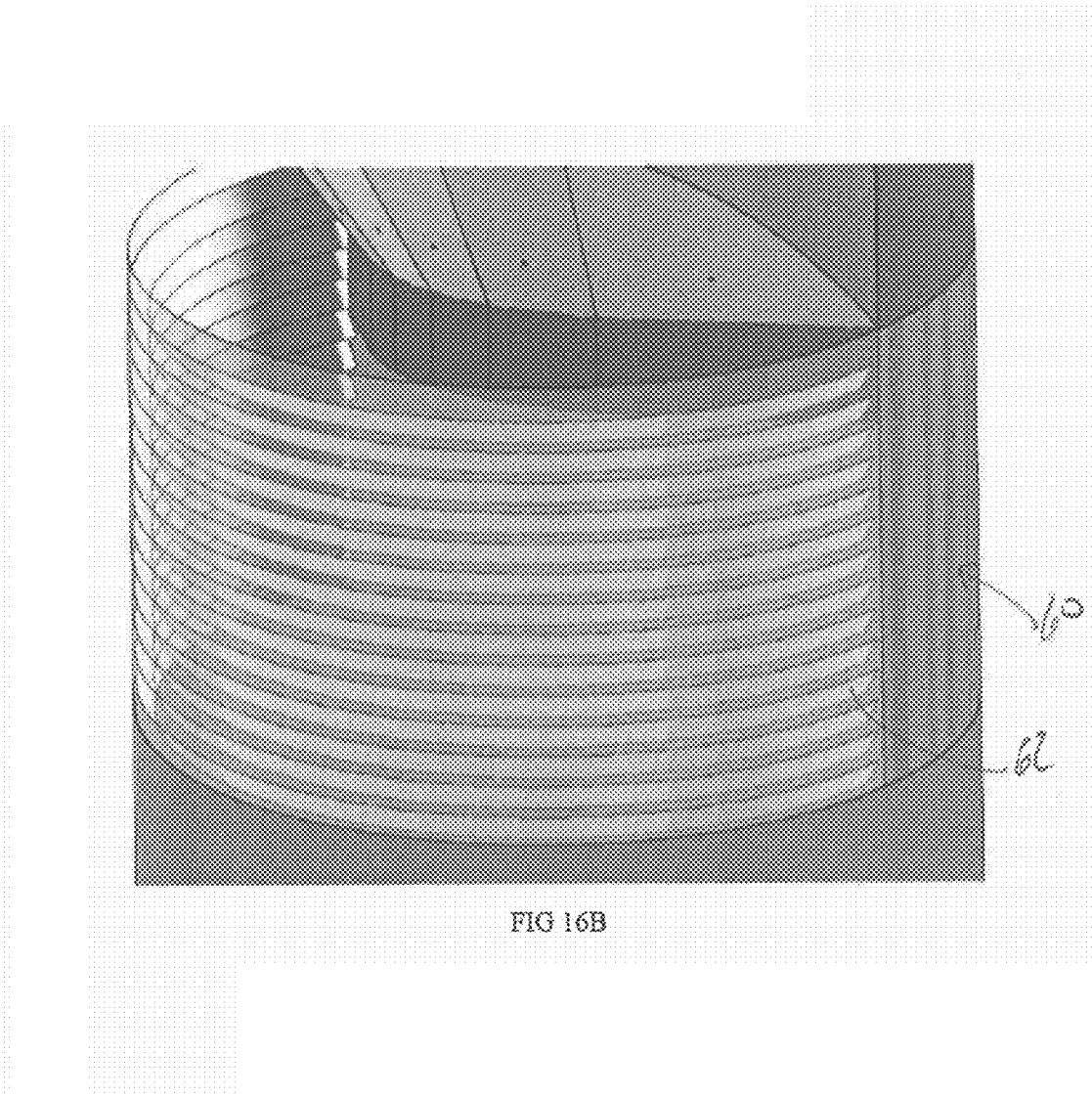

In an alternative embodiment, a solar collector 160 may include a louver-like implementation 62 inside the window surface 60, like that shown in FIG. 16A. The louver 62 inside the window surface 60 further directs light incident on the window surface downward into the light-pipe. A close-up view of a reflective louver assembly behind the transparent window surface 60 is shown in FIG. 16B.

Figure 16C:
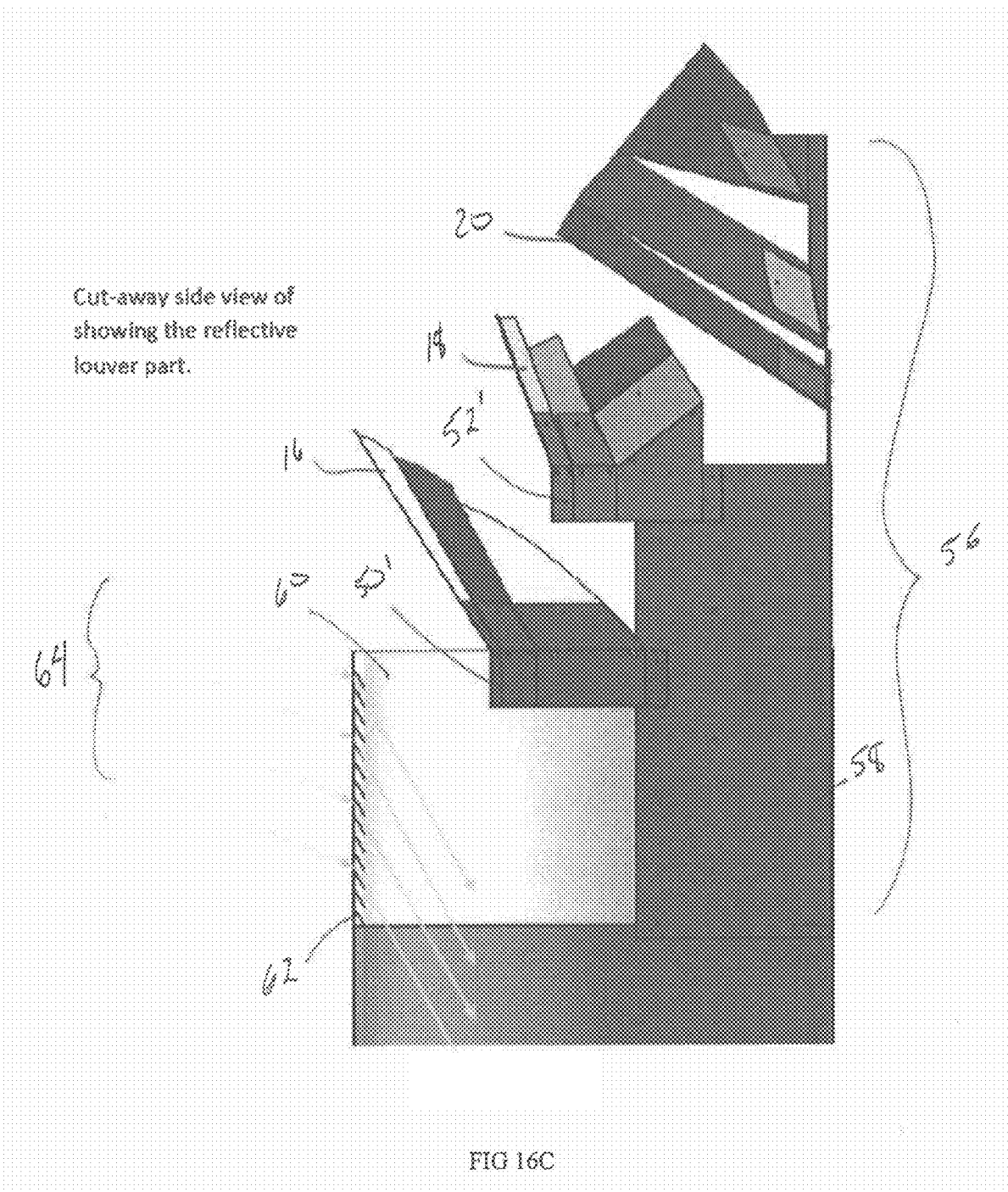

FIG. 16C depicts a cut-away view of an illustrative collector in which a louver is implemented. Reflectors 16, 18, 20 are affixed to a rear support 58. Reflectors 16, 18 are affixed to the rear support 58 by a series of vertical baffles 50', 52'. According to the illustrative embodiment, the mirror array 56 is raised and includes shortened baffles to allow for greater exposure to the sunlight. A transparent window area is affixed to the collector extending around the circumference from the rear support 58. A louver 62 is affixed to the transparent window 60. As shown by rays 64, light incident on the window surface area 60 is reflected downward by the louver 62 and into the central area of the collector increasing the amount and strength of the light collected by the collector.

A solar collector according to the present teachings find a variety of applications. For example, such a solar collector can be employed in residential and commercial lighting applications.

Those having ordinary skill in the art will appreciate that various changes can be made to the above embodiments without departing from the scope of the invention. For example, while certain elements of the described embodiments detail components in various alignments, such as vertical, perpendicular, parallel, etc., one of skill in the art would recognize that other arrangements of the components may be implemented without deviating from the scope and spirit of the invention.

The invention claimed is:

1. A solar collector, comprising:
a light pipe having an optical axis and extending from a proximal end configured to receive sunlight to a distal end,
a plurality of reflective elements optically coupled to the light pipe,
wherein each of the reflective elements is configured to direct at least a portion of sunlight incident thereon into the light pipe via the proximal end substantially parallel to the optical axis for a different portion of a daily time interval,
wherein each of the reflective elements comprises a front reflective surface for specularly reflecting incident sunlight and a back reflective surface for diffusely reflecting incident sunlight.

2. The solar collector of claim 1, wherein each of the reflective elements is configured to direct at least about 80 percent of the incident sunlight into the light pipe substantially parallel to the optical axis during said portion of the daily time interval associated with that reflective element.

3. The solar collector of claim 1, wherein each of the reflective elements is configured to direct at least about 90 percent of the incident sunlight into the light pipe substantially parallel to the optical axis during said portion of the daily time interval associated with that reflective element.

4. The solar collector of claim 1, wherein the reflective elements are fixedly disposed relative to one another and relative to the light pipe.

5. The solar collector of claim 1, wherein the reflective elements comprise at least a first reflector array configured for directing incident sunlight into the light pipe substantially parallel to the optical axis during a first time interval in spring or fall at a reference location and a second reflector array configured for directing incident sunlight into the light pipe substantially parallel to the optical axis during a second time interval in winter at the reference location.

6. The solar collector of claim 5, wherein a surface area of the front reflective surface of at least one reflector in the second array is less than a respective surface area of at least one reflector in the first array.

7. The solar collector of claim 5, wherein the first time interval is a time interval at winter solstice.

8. The solar collector of claim 5, wherein the second time interval is a time interval at spring or fall equinox.

9. The solar collector of claim 1, wherein the front reflective surface is flat.

10. The solar collector of claim 1, wherein the front reflective surface is convex with a radius of curvature in a range of about 3 inches to about 10 inches.

11. The solar collector of claim 1, wherein the front surface is a coated aluminum surface.

12. The solar collector of claim 1, wherein the front surface is a vacuum metalized molded plastic surface.

13. The solar collector of claim 1, wherein each of the reflective elements is positioned around the optical axis based on the azimuth angle of the sun during said portion of the daily time interval associated with that reflective element so as to receive sunlight and is tilted relative to the optical axis so as to direct at least a portion of the received sunlight into the light pipe substantially parallel to the optical axis.

14. The solar collector of claim 13, wherein the reflective elements are positioned relative to the optical axis at tilt angles in a range of about 25 degrees to about 50 degrees.

15. The solar collector of claim 1, wherein the reflective elements are configured such that the irradiance of light exiting the distal end of the light pipe is characterized by a substantially flat lumens curve for said daily time interval within at least one day of the year.

16. The solar collector of claim 15, wherein the daily time interval comprises at least 8 hours.

17. The solar collector of claim 1, wherein the light pipe comprises an internal reflective surface.

18. The solar collector of claim 17, wherein the internal reflective surface is rotationally symmetric about the optical axis.

19. The solar collector of claim 1, further comprising a diffuser optically coupled to the distal end of the light pipe.

20. The solar collector of claim 1, wherein the reflective elements are configured such that the back surfaces thereof block entry of at least about 20 percent of sunlight energy into the light pipe for an altitude angle of the sun greater than about 30 degrees.

21. A solar collector, comprising:
a light pipe having an optical axis and extending from a proximal end configured to receive sunlight to a distal end;
a plurality of reflective elements configured to direct at least a portion of sunlight incident thereon into the light pipe via the proximal end substantially parallel to the optical axis for a different portion of a daily time interval; and
a plurality of baffles configured to modulate the sunlight received by the light pipe,
a rear support element, the plurality of reflective elements being coupled to the light pipe by the rear support element,
wherein the baffles are affixed to the rear support element a distance D above the proximal end of the light pipe and are substantially parallel to the optical axis of the light pipe.

22. The solar collector of claim 21 wherein an interior surface of the rear support element is specularly reflective.

23. The solar collector of claim 21 wherein an interior surface of the light pipe is specularly reflective.

24. The solar collector of claim 21 wherein the distance D is between 20-30% of the diameter of the light pipe.

25. The solar collector of claim 21 further comprising a window disposed about the circumference of the light pipe and extending above the proximal end of the light pipe.

26. The solar collector of claim 25 further comprising a louver disposed on an inside surface of the window.

27. The solar collector of claim 21 wherein the plurality of reflective elements comprise a first, second and third reflector arrays; the first and second reflector arrays optically coupled to the light pipe by said plurality of baffles substantially parallel to the optical axis of the light pipe.

28. The solar collector of claim 21 wherein the plurality of baffles are non-specularly reflective.

29. The solar collector of claim 28 wherein the plurality of baffles are matte-finished aluminum.

30. The solar collector of claim 21 further comprising a lens optically coupled to the proximal end of the light pipe for focusing at least a portion of the sunlight incident thereon into the light pipe.

* * * * *